United States Patent
Ohme et al.

(10) Patent No.: US 8,583,517 B1
(45) Date of Patent: Nov. 12, 2013

(54) SYSTEMS AND METHODS FOR GENERATING AND SENDING ELECTRONIC MESSAGES RELATED TO A TAX RETURN

(75) Inventors: Phillip J. Ohme, San Diego, CA (US); Brett A. Hellman, Mountain View, CA (US); Dante Cassanego, Durham, NC (US); Kathy A. Kirkendall, La Jolla, CA (US)

(73) Assignee: Intuit Inc., Mountain View, CA (US)

( * ) Notice: Subject to any disclaimer, the term of this patent is extended or adjusted under 35 U.S.C. 154(b) by 422 days.

(21) Appl. No.: 12/771,698

(22) Filed: Apr. 30, 2010

(51) Int. Cl.
*G06F 17/22* (2006.01)
*G07F 19/00* (2006.01)
*G07B 17/00* (2006.01)

(52) U.S. Cl.
USPC .............................................. 705/31; 705/30

(58) Field of Classification Search
None
See application file for complete search history.

(56) References Cited

U.S. PATENT DOCUMENTS

| | | | |
|---|---|---|---|
| 6,202,052 B1 | 3/2001 | Miller | |
| 6,401,079 B1 | 6/2002 | Kahn et al. | |
| 6,446,048 B1 * | 9/2002 | Wells et al. | 705/35 |
| 6,697,787 B1 | 2/2004 | Miller | |
| 6,823,478 B1 | 11/2004 | Prologo et al. | |
| 7,234,103 B1 | 6/2007 | Regan | |
| 7,272,633 B2 | 9/2007 | Malik et al. | |
| 7,289,794 B2 * | 10/2007 | Bowne et al. | 455/414.1 |
| 7,424,485 B2 | 9/2008 | Kristiansen et al. | |
| 7,565,312 B1 | 7/2009 | Shaw et al. | |
| 7,636,742 B1 | 12/2009 | Olavarrieta et al. | |
| 7,720,616 B2 * | 5/2010 | Wyle et al. | 702/31 |
| 7,742,958 B1 | 6/2010 | Leek et al. | |
| 7,917,411 B1 | 3/2011 | Bedell | |
| 7,937,451 B2 * | 5/2011 | Ho et al. | 709/217 |
| 8,190,499 B1 | 5/2012 | McVickar | |
| 2001/0037268 A1 | 11/2001 | Miller | |
| 2002/0013747 A1 | 1/2002 | Valentine et al. | |
| 2002/0091602 A1 | 7/2002 | Stern et al. | |
| 2002/0111888 A1 | 8/2002 | Stanley et al. | |
| 2004/0078271 A1 | 4/2004 | Morano et al. | |
| 2004/0083145 A1 | 4/2004 | Kobayashi et al. | |
| 2004/0088233 A1 | 5/2004 | Brady et al. | |
| 2005/0228729 A1 | 10/2005 | Cook et al. | |
| 2006/0085304 A1 | 4/2006 | Buarque De Macedo et al. | |
| 2006/0111990 A1 | 5/2006 | Cohen et al. | |

(Continued)

OTHER PUBLICATIONS

Amendment dated Jan. 5, 2012 in U.S. Appl. No. 12/239,413, filed Sep. 26, 2008, (18 pages).

(Continued)

*Primary Examiner* — Asfand Sheikh
(74) *Attorney, Agent, or Firm* — Vista IP Law Group LLP

(57) ABSTRACT

Sending electronic messages related to a tax return from a mobile communication device of an accountant or client. Computers having tax preparation programs that are utilized prepare tax returns are synchronized with a host computer. A browser executes on a mobile communication device and a web application on the second computer executes to display a client list. A client is selected, and the web application presents an interface including tax return data of the selected client on the mobile communication device. The interface includes an icon or object that when selected generates a message window that may be at least partially automatically populated. A message may be typed in the window and sent from the mobile communication device. For example, the accountant may send a self-addressed message to a computer utilized to prepare the tax return, or the client may send the accountant a message.

30 Claims, 22 Drawing Sheets

(56) References Cited

U.S. PATENT DOCUMENTS

| | | |
|---|---|---|
| 2006/0178961 A1 | 8/2006 | Stanley et al. |
| 2006/0235776 A1 | 10/2006 | Temme |
| 2006/0271451 A1 | 11/2006 | Varughese |
| 2007/0033117 A1 | 2/2007 | Murray |
| 2007/0050277 A1 | 3/2007 | Wilson |
| 2007/0136157 A1 | 6/2007 | Neher et al. |
| 2007/0168861 A1 | 7/2007 | Bell et al. |
| 2007/0233596 A1 | 10/2007 | Ambrose |
| 2007/0250418 A1 | 10/2007 | Banks et al. |
| 2008/0071703 A1 | 3/2008 | Evans |
| 2008/0249816 A1 | 10/2008 | Khalilian et al. |
| 2009/0048903 A1 | 2/2009 | Lieberman |
| 2009/0234720 A1 | 9/2009 | George et al. |
| 2009/0287591 A1 | 11/2009 | Wyle et al. |
| 2009/0307279 A1 | 12/2009 | Freedman |
| 2010/0161460 A1 | 6/2010 | Vroom et al. |
| 2010/0332362 A1 | 12/2010 | Ramsey et al. |
| 2011/0078062 A1 | 3/2011 | Kleyman |
| 2011/0137823 A1 | 6/2011 | Robb |

OTHER PUBLICATIONS

Interview Summary dated Jan. 23, 2012 in U.S. Appl. No. 12/239,413, filed Sep. 26, 2008, (4 pages).
Office Action dated May 3, 2011 in U.S. Appl. No. 12/545,592, filed Aug. 21, 2009, (12 pages).
Interview Summary dated Aug. 22, 2011 in U.S. Appl. No. 12/545,592, filed Aug. 21, 2009, (3 pages).
Amendment dated Sep. 6, 2011 in U.S. Appl. No. 12/545,592, filed Aug. 21, 2009, (14 pages).
Non-Final Office Action dated Dec. 7, 2011 in U.S. Appl. No. 12/612,596, filed Nov. 4, 2009, (20 pages).
Amendment dated Mar. 7, 2012 in U.S Appl. No. 12/612,596, filed Nov. 4, 2009, (15 pages).
Interview Summary dated Mar. 12, 2012 in U.S. Appl. No. 12/612,596, filed Nov. 4, 2009, (3 pages).
Non-Final Office Action dated Dec. 22, 2011 in U.S. Appl. No. 12/772,020, filed Apr. 30, 2010, (51 pages).
Amendment dated Mar. 22, 2012 in U.S. Appl. No. 12/772,020, filed Apr. 30, 2010, (23 pages).
Office Action dated Dec. 22, 2011 in U.S. Appl. No. 12/771,622, filed Apr. 30, 2010, (14 pages).
Interview Summary dated Mar. 20, 2012 in U.S. Appl. No. 12/771,622, filed Apr. 30, 2010, (3 pages).
Amendment dated Mar. 22, 2012 in U.S. Appl. No. 12/771,622, filed Apr. 30, 2010, (15 pages).
Amendment dated Apr. 5, 2012 and Notice of Allowance dated Apr. 13, 2012 in U.S. Appl. No. 12/545,592, filed Aug. 21, 2009, (15 pages).
Office Action dated Apr. 9, 2012, Interview Summary dated Jul. 13, 2012 and Amendment dated Aug. 9, 2012 in U.S. Appl. No. 12/612,596, filed Nov. 4, 2009, (40 pages).
Final Office Action dated Jun. 6, 2012 and Amendment dated Aug. 29, 2012 in U.S. Appl. No. 12/772,020, filed Apr. 30, 2010, (51 pages).
Final Office Action dated Jun. 8, 2012 and Amendment dated Aug. 28, 2012 in U.S. Appl. No. 12/771,622, filed Apr. 30, 2010, (31 pages).
Non-Final Office Action dated Mar. 15, 2011 in U.S. Appl. No. 12/239,413, filed Sep. 26, 2008, (27 pages).
Interview Summary dated Jun. 7, 2011 in U.S. Appl. No. 12/239,413, filed Sep. 26, 2008, (3 pages).
Amendment dated Jun. 13, 2011 in U.S. Appl. No. 12/239,413, filed Sep. 26, 2008, (14 pages).
Final Office Action dated Oct. 5, 2011 in U.S. Appl. No. 12/239,413, filed Sep. 26, 2008, (51 pages).
ProSeries Online User Guide for Tax Year 2007, Introduction, "Computer System Requirements", Ch 13, "Entering Data on Forms and QuickEntry Sheets: Tracking Information That Clients Haven't Provided Yet," and Ch20, "Electronic Filing: Overview," http://http-download.intuit.com/http.intuit/CMO/proseries/resources/user_guide/ty07/index.htm (15 pgs.).
Non-Final Office Action dated Mar. 17, 2011 in U.S. Appl. No. 12/612,596, filed Nov. 4, 2009, (17 pages).
Interview Summary dated Jun. 8, 2011 in U.S. Appl. No. 12/612,596, filed Nov. 4, 2009, (3 pages).
Amendment dated Jun. 13, 2011 in U.S. Appl. No. 12/612,596, filed Nov. 4, 2009, (16 pages).
Final Office Action dated Aug. 4, 2011 in U.S. Appl. No. 12/612,596, filed Nov. 4, 2009, (21 pages).
Amendment dated Aug. 10, 2011 in U.S. Appl. No. 12/612,596, filed Nov. 4, 2009, (16 pages).
ProSeries Online User Guide for Tax Year 2007, Introduction, "Computer System Requirements", Ch13, "Entering Data on Forms and QuickEntry Sheets: Tracking Information That Clients Haven't Provided Yet," and Ch20, "Electronic Filing: Overview," http://http-download.intuit.com/http.intuit/CMO/proseries/resources/user_guide/ty07/index.htm (15 pages).
Office Action dated Mar. 15, 2011 in U.S. Appl. No. 12/239,413, filed Sep. 26, 2008, Applicant: Martin G. Lewandowski (42 pages).
Amendment dated Jun. 13, 2011 in U.S. Appl. No. 12/239,413, filed Sep. 26, 2008, Applicant: Martin G. Lewandowski (14 pages).
Notice of Allowance dated Nov. 8, 2012 and Amendment dated Feb. 8, 2013 in U.S. Appl. No. 13/475,744, filed May 18, 2012, (19 pages).
Final Office Action dated Oct. 2, 2012 and Amendment dated Dec. 21, 2012 in U.S. Appl. No. 12/612,596, filed Nov. 4, 2009, (36 pages).

* cited by examiner

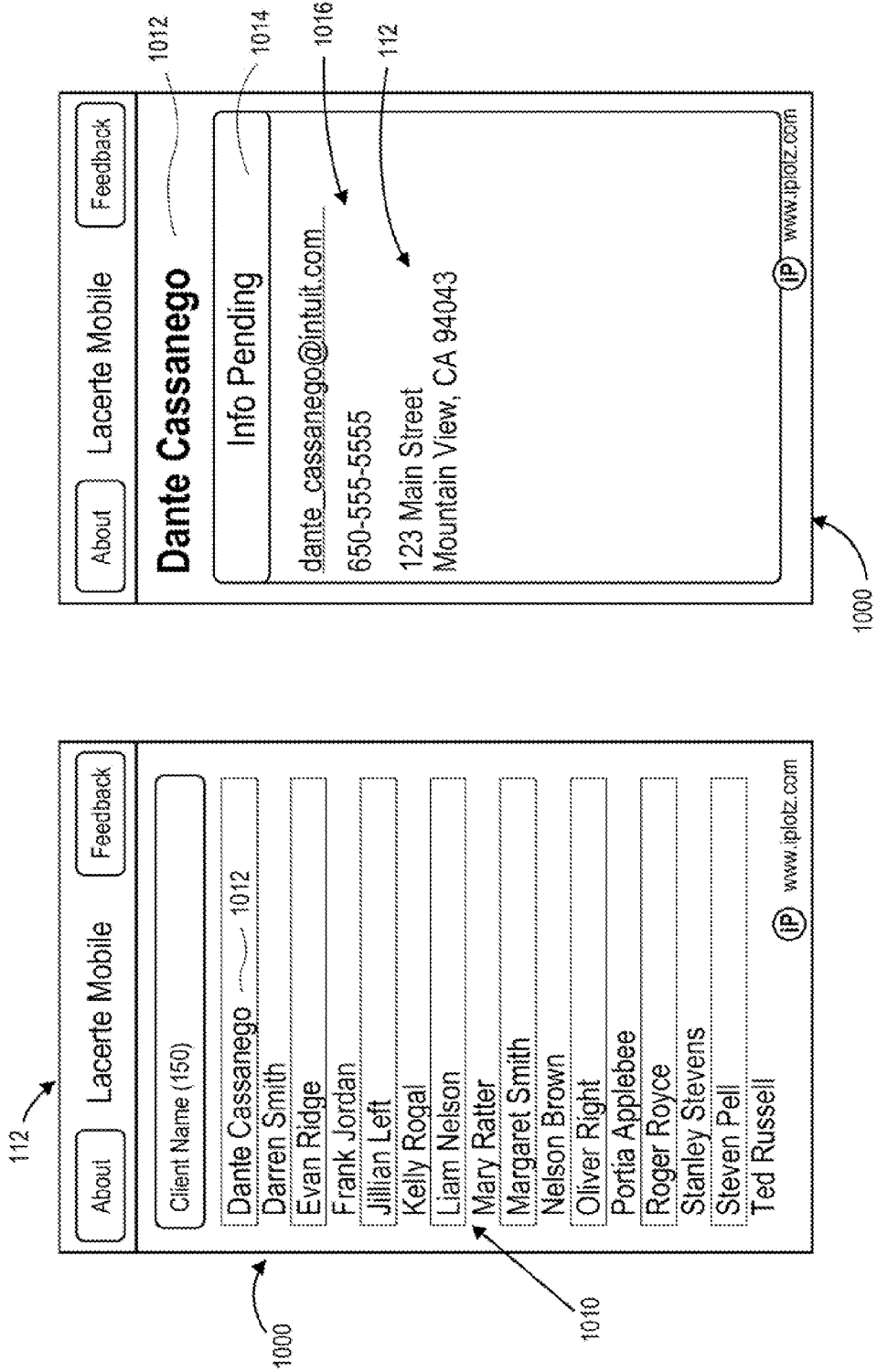

SYSTEMS AND METHODS FOR GENERATING AND SENDING ELECTRONIC MESSAGES RELATED TO A TAX RETURN

BACKGROUND

The invention relates to preparation of tax returns. Accountants and tax professionals have utilized financial management and tax preparation programs to manage finances and tax matters for their clients. For example, accountants and tax professionals utilize financial management programs such as QuickBooks® and tax preparation programs such as Lacerte®, ProSeries®, TurboTax® ProLine™ Tax On-Line, available from Intuit Inc. and other programs including, for example, programs available from Thomson Reuters, CCH and Drake Software. QuickBooks®, Lacerte®, ProSeries® and TurboTax® are registered trademarks of Intuit Inc. as well as financial management and tax preparation programs available from other sources. While these and other financial management and tax preparation programs have been used effectively in the past, accountants often have difficulty tracking the status of matters such as tax returns.

For example, an accountant receives many calls from clients about their tax returns throughout the day. Sometimes the accountant is at his or her computer such that the accountant can accept the call, use the computer and tax preparation program to open the tax return of the client who called to review the tax return and answer the client's question. At other times, the accountant is away from his or her desk, e.g., the accountant may be out to lunch, at a meeting, traveling, etc. In these cases, the accountant is not seated at the desk and cannot utilize the computer and tax preparation program to access the tax return of the client who called. Consequently, when away from the computer, the accountant may not be able to accept client calls or if calls are accepted, may be required to advise the client that the client must wait for the accountant to return to the office or guess as to an answer to the client's question. Thus, the client may not receive an acceptable answer and may have to wait hours or days for an answer. This can be frustrating, inconvenient and problematic as tax return filing deadlines approach.

These shortcomings ultimately result in diminished or lack of responsiveness and a decline in customer service to the client and are due in part to the limited resources and capabilities of accountants, particularly during tax season, limited access to tax preparation programs and tax returns prepared thereby since accountants have access to tax preparation programs, which can be costly (particularly professional programs purchased by accountants) and, therefore, are not purchased or accessed by clients, and the need in many cases for specialized tax and accounting knowledge to prepare a tax return. Thus, even if the client has purchased a tax preparation program and can access the tax return, the client may not even know where to search for an answer since tax returns can be complex. These and other factors have resulted in clients relying on accountants for tax return information and direct accountant-client communications, thereby resulting in clients having difficulties acquiring information about their tax returns since they are forced to rely on another person and the program utilized to prepare the return may not even be available to the client.

SUMMARY

One embodiment is directed to a method for providing tax return data to a mobile communication device. The method comprises steps of receiving tax return data from a first computer of an accountant of the tax return and at a second or host computer over a first network. The method further comprises receiving, at the second computer, a request for tax return data from a mobile communication device, e.g., of the client or accountant, that is transmitted over a second network comprising a wireless network and allowing the mobile communication device to access tax return data hosted by the second computer in response to the request.

Another embodiment is directed to a method for providing tax return data to multiple or different mobile communication devices and comprises receiving respective first tax return data of a first plurality of tax returns of a first plurality of clients from a first computer of a first accountant preparing tax returns, the respective first tax return data is received at a second computer over a first network, and receiving respective second tax return data of a second plurality of tax returns from a third computer of a second preparer, the respective second tax return data being received at the second computer over a second network. The method further comprises receiving, at the second computer, a first request for tax return data of a selected client of the first plurality of clients, the first request being received from a first mobile communication device, e.g. of the client or the first accountant, over a third network comprising a first wireless network, and allowing the first mobile communication device to access tax return data of the selected client of the first plurality of clients hosted by second computer through the first wireless network in response to the first request. The method further comprises receiving, at the second computer, a second request for tax return data of a selected client of the second plurality of clients, the second request being received from a second mobile communication device, e.g. of a second client or second accountant over a fourth network comprising a second wireless network, and allowing the second mobile communication device to access tax return data of the selected client of the second plurality of clients hosted by the second computer through the second wireless network in response to the second request.

A further embodiment is directed to a method for retrieving tax return data with a mobile communication device and comprises selecting a client from a list of a plurality of clients for whom a tax return is being prepared using a mobile communication device that is transportable by the accountant preparing the tax return to a location that is remote relative to a first computer utilized to prepare the tax return. The method further comprises transmitting a request for tax return data of the selected client from the mobile communication device to a second computer over a first network comprising a wireless network, the first computer and the second computer being in communication with each other through a second network. Tax return data of the selected client is accessed by the mobile communication device.

A further embodiment is directed to a method for transmitting a message related to a tax return to a computer utilized to prepare the tax return. The method comprises selecting a client from a list of a plurality of clients for whom a tax return is being prepared using a mobile communication device of a client or accountant and that is transportable to a location that is remote relative to a first computer utilized to prepare the tax return. The method further comprises transmitting a request for tax return data of the selected client from the mobile communication device to a second computer over a first network comprising a first wireless network, the first computer and the second computer being in communication with each other through a second network, and allowing the mobile communication device to access tax return data of the selected client. The method further comprises generating an electronic message related to at least one of the client and the received tax return data using the mobile communication device and transmitting the electronic message from the mobile communication device to the first computer over a third network comprising a second wireless network. Thus, with embodiments, accountants can send themselves a message about a client or tax return, e.g., if the client calls and the accountant is out of the office or does not have access to the tax return, and the message may remind the accountant about what was discussed with the client, and clients can send e-mails to accountants after viewing their tax return data hosted by the second computer.

Yet another embodiment is directed to a method for transmitting a message related to a tax return to a computer utilized to prepare the return and comprises executing a browser on the mobile communication device to display a user interface including a list of clients for whom respective tax returns are being prepared. The user of the mobile communication device, in certain embodiments, is the accountant preparing respective tax returns with a tax preparation program executing on a first computer that is in communication with a second computer over a first network. The second computer hosts tax return data of a plurality of clients of the accountant, and the list of clients is downloaded from the second computer to the mobile communication device over a second network comprising a first wireless network. The method further comprises the user or accountant selecting a client from the list to display tax return data of the selected client, selecting a message icon or object within the interface to launch a message program on the mobile communication device, entering message data into a data entry window generated by the message program to create the electronic message related to the tax return, and transmitting the electronic message from the mobile communication device to the first computer. Further, in the event that the client utilizes a mobile communication device to access tax return data, the client list may include only the client's name (for confidentiality purposes).

An additional embodiment is directed to a method for providing an electronic message related to a tax return to a computer utilized to prepare the tax return and comprises the user of a mobile communication device preparing at least a portion of respective tax returns of respective clients using a tax preparation program executing on a first computer at a first location. Respective tax return data of respective tax returns generated by the tax preparation program is uploaded from the first computer to a second computer, e.g. using a synchronization program executing on the first computer, which is in communication with the second computer through a first network. The method further comprises the accountant or client leaving the first location and arriving at a second location that is remote relative to the first location, i.e., a location away from the first computer such that the accountant and client cannot access the tax return on the first computer. The method further comprises executing a browser on the mobile communication device at the second, remote location to retrieve tax return data comprising a list of clients from the second computer through a second network comprising a first wireless network, selecting a client from the list that is displayed within an interface generated by a web application executing on the second or host computer and accessing or receiving tax return data of the selected client from the second computer at the mobile communication device. A message icon or object within the interface is selected by the accountant to launch a message program on the mobile communication device, and the accountant enters message data into a data entry window generated by the message program to create the message related to the tax return. The message is then transmitted from the mobile communication device to the first computer. Embodiments may also apply to providing the client with mobile access to the data in which case the client list may include only the client name, and the client may, for example, send a self-reminder message or a message to the accountant.

Yet another embodiment is directed to synchronizing tax return data prepared using a tax preparation application on a first computer with a second computer and a mobile communication device. Further embodiments are directed to synchronization programs and mobile access or download applications that can be implemented as software, hardware or combinations thereof, and that are operable to synchronize a computer that is utilized to prepare a tax return and to allow a mobile communication device to access synchronized tax return data such that updated or current data of the first computer can be displayed on the mobile communication device.

Other embodiments are directed to systems for providing mobile access to tax return data. Systems may be configured to implement method embodiments described above.

For example, one embodiment is directed to a system for providing tax return data to a mobile communication device. The system comprises a first computer, a second computer and a mobile communication device. A tax preparation program executes on the first computer and is utilized by the accountant to prepare a tax return on behalf of a client. The first and second computers are in communication with each other through a first network and are operable such that tax return data generated by the tax preparation program is transmitted from the first computer to the second computer. The mobile communication device, which can be carried or transported by the accountant to a location other than or that is remote relative to a first computer, is in communication with or can establish a connection with the second computer through a second network comprising a wireless network. A browser executes on the mobile communication device to load a web application and request access to tax return data hosted by the second computer over the wireless network.

According to another embodiment, a system for providing tax return data comprises a host computer comprising a download application a synchronization program, which may reside on the host computer or on another computer that can be accessed by the host computer. The system may, in certain embodiments, also include a computer and a tax preparation program that may be utilized to prepare a tax return. The host computer is configured or operable to execute the synchronization program to receive tax return data from a computer utilized to prepare a tax return (e.g., a computer of an accountant) through a network. For this purpose, for example, the host computer may be operable or configured to download the synchronization program onto the computer utilized to prepare the tax return. Upon installation and execution of the synchronization program, the host computer is operable or configured to receive tax return data from the computer utilized to prepare the tax return. The host computer is further operable or configured to communicate with a mobile communication device to provide mobile access to tax return data that was uploaded to the host computer with the synchronization program. For this purpose, the download application of the host computer can be accessed by a mobile communication device, e.g., executed as a result of entry of an address or location of the download application into a browser executing on the mobile communication device, and is operable or configured to receive a request regarding a particular client and to allow mobile access to tax return data stored on the host computer.

Certain system embodiments are directed to multiple computers and a mobile communication device in which a tax preparation program is executed on a first computer to prepare a tax return, thereby generating tax return data, and synchronized with the other computer(s) such that the mobile communication device can access synchronized tax return data generated by the tax preparation application.

System embodiments may involve one accountant or multiple accountants, each of which has one or multiple clients and that have respective mobile communication devices for retrieving respective tax return data from the second or host computer. Thus, in such embodiments, the accountants utilize their respective tax preparation programs executing on their respective computers to prepare respective tax returns for respective clients. Tax return data from each computer utilized to prepare a tax return is transmitted to the second or host computer. Each accountant can utilize a mobile communication device to access and display tax return data of their own clients.

Other system embodiments involve a mobile communication device on which a browser executes to connect with the second computer and download tax return data to the mobile communication device. Tax return data that is accessed by and displayed on the mobile communication device based upon selection criteria such as client identifier or name, which can be selected by the preparer using an interface that is generated by an application executing on the second computer.

In certain system embodiments, the interface generated by the application executing on the mobile communication device may include an icon or object that may be selected by the user to launch a message program that generates window for entering data utilizing the keyboard of the mobile communication device. This allows the accountant to enter data into the mobile communication device, and the resulting message may be sent from the mobile communication device to the computer utilize to prepare or access the tax return, thus serving as a self-reminder for when the accountant returns to the office and a message is waiting at the computer to remind the accountant of the client conversation that occurred thus enabling the accountant to remember which client called and the nature of the client's inquiry. Thus, in these system embodiments, the accountant utilizes the first computer and tax preparation executing thereon to begin preparation nor prepare a tax return and a mobile communication device such a cellular telephone or Smartphone to send a reminder to the first computer when the accountant is away form the desk or office, and the accountant can read the message at the first computer when the accountant returns to the first computer.

System embodiments may involve providing accountants with mobile access to tax return data of their clients and providing clients with mobile access to their own tax return data.

In one or more embodiments, the mobile communication device, such as a cellular telephone or a Smartphone, is utilized and carried by an accountant who prepares tax returns on behalf of clients utilizing a tax preparation program executing on the first computer at a first location. With embodiments, the accountant is able to access tax return data such as tax return status, why a tax return was rejected by a tax authority, a refund or payment amounts and information required to complete the return with the mobile communication device. This information generated or provided by the tax preparation program can be accessed with the mobile communication device at a location that is remote relative to the computer utilized to prepare the tax returns. For example, the accountant may be away from the first computer in a different office in the same building, traveling in a car or on a train, at the airport, or in a different city, state or country.

With one or more embodiments, a synchronization program is loaded onto the first computer that is utilized by the accountant to prepare tax returns. The synchronization program can be downloaded from the second or host computer and can be launched each time data is to be uploaded to the second computer or the synchronization program can execute in the background to upload tax return data from the first computer to the second computer automatically. After a connection is established between the first and second computers, the accountant enters a user name or log in and a password to access the second computer, and respective data of respective tax returns of respective clients of the accountant are transmitted from the first computer to the second computer to synchronize the first and second computers such that they have the same tax return data. This may be done periodically (e.g., hourly, daily, etc.) or in response to a pre-determined action or change, e.g., an update to tax return data of one or more clients.

Respective data uploaded from the computer utilized to prepare tax returns is stored at the second computer with respective addresses, locations or identifiers. Thus, when a request for tax return data is made using a mobile communication device, an application for accessing tax return data executes on the second or host computer to provide access to a client list, which is displayed on the mobile communication device. The accountant selects a client, and tax return data at an address or location or identified by the identifier corresponding to the selected client can then be accessed by the mobile communication device. The tax return data that is accessed by and displayed on the mobile communication device may be all of the tax return data that was uploaded by the first computer or only a portion of the uploaded data, e.g., if the user selects the client and also selects certain information of the client to be downloaded or if the second computer is configured to download only certain types of tax return data.

Embodiments may involve a single accountant and clients of the single accountant for whom respective tax returns are prepared. Embodiments may also involve multiple accountants and their respective clients. Thus, one or multiple accountants can access and view respective tax return data for selected clients from the second computer utilizing their own respective mobile communication devices.

With embodiments, the computers that are used to prepare the tax return and the second or host computer are synchronized such that tax return data on each of the preparation computers is uploaded to the second computer and all of the computers utilized to prepare tax returns are synchronized with the second or host computer. On the second computer, tax return data can be stored at a particular address, location or page according to an accountant identifier or accountant name. A browser is executed on the mobile communication device, which is connected to the second computer by entering or loading the address or location of the web application on the second computer. The web application provides access to, displays or downloads the client list on the mobile communication device and tax return data of a client selected from the list.

In one or more embodiments in which an electronic message such as an e-mail or text or Short Message Service (SMS) message is sent from the mobile communication device to the first computer, a portion of the electronic message may automatically populated in response to the prepare selecting the client. For example, if the accountant wants to send a self-reminder to the first computer, the "To" field of the electronic message may be automatically populated with an electronic mail address of the accountant, and a subject field of the electronic message may be automatically populated with information related to at least one of the selected client and tax return data of the selected client.

Further, with embodiments, accountants are able to access, view or download data about a selected client with a "single click" of a client name or other identifier on the mobile communication device. This allows the accountant to quickly access important client and tax return data with a single screen or single click.

Embodiments may involve financial data including tax return data and/or accounting data generated utilizing tax preparation and/or financial management programs.

BRIEF DESCRIPTION OF THE DRAWINGS

The foregoing and other aspects of embodiments are described in further detail with reference to the accompanying drawings, wherein:

FIG. 8 illustrates an example of a log-in or authentication screen generated by the web application and displayed on the mobile communication device;

FIG. 9 illustrates an example of a keypad that may be generated by the web application and displayed on the mobile communication device requesting the accountant to enter a pin before displaying a client list;

FIGS. 10A-B are examples of screen shots or interfaces including tax return data of a list of client names and additional tax return data that is displayed upon selecting a client name from the list shown in FIG. 10A;

FIGS. 11A-B are further examples of screen shots or interfaces including tax return data of a list of client names and text status indicators presented together and additional tax return data that is displayed upon selecting a client name from the list shown in FIG. 11A, and wherein FIG. 11B illustrates a message icon or object that can be selected by the accountant to allow the accountant to prepare and send an e-mail or other electronic message from the mobile communication device to the computer used to prepare the tax return;

FIGS. 12A-B are other examples of screen shots or interfaces including tax return data of a list of client names and visual or graphic status indicators presented together and additional tax return data that is displayed upon selecting a client name from the list shown in FIG. 12A, wherein FIG. 12B illustrates a message icon or object that can be selected by the accountant to allow the accountant to prepare and send an e-mail or other electronic message from the mobile communication device to the computer used to prepare the tax return;

FIGS. 13A-C are further examples of screen shots or interfaces including tax return data of a list of client names and visual or graphic status indicators presented together and additional tax return data that is displayed upon selecting a client name from the list shown in FIGS. 13A-B, wherein FIG. 13C illustrates a message icon or object that can be selected by the accountant to allow the accountant to prepare and send a text or other electronic message from the mobile communication device to the computer used to prepare the tax return;

DETAILED DESCRIPTION OF ILLUSTRATED EMBODIMENTS

Figure 1:
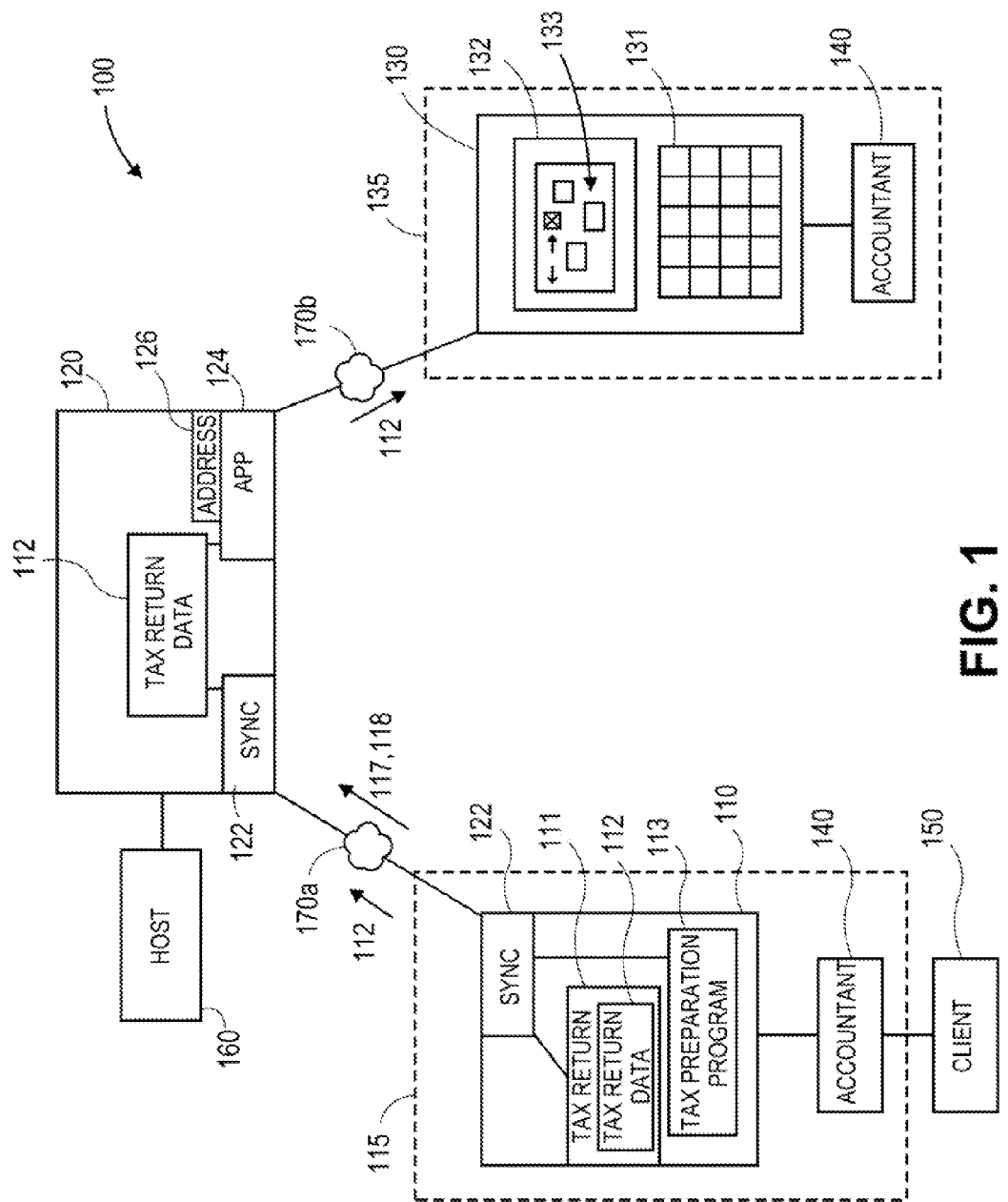
FIG. 1 illustrates a system constructed according to one embodiment for providing mobile access to tax return data.

Embodiments are directed to providing mobile access to financial data such as accounting and tax return data and for providing accountants and/or clients with the ability to send electronic messages related to accounting data and tax return data from a mobile communication device to, for example, allow the client to send an e-mail, e.g., to the accountant, and to allow the accountant send a self-reminder to the computer utilized to prepare a tax return such that when the accountant returns to the office, a message about a client or client inquiry is waiting for the accountant. Thus, with embodiments, accountants and/or clients are able to access client and tax return data and send messages from anywhere at anytime. Embodiments provide these capabilities within a secure environment such that clients and accountants can access personal and confidential data on a mobile communication device.

These capabilities also allow the accountant to respond to client inquiries when the accountant does not have access to the tax return, e.g., when the accountant is at a remote location such as out of the office, at a meeting, out to lunch, away from his or her desk, at an airport, at a hotel, in a car, on a train, etc. Embodiments also provide important tax return data at fingertips of the accountant and/or client, which may be presented in a single screen or downloaded by a single click of a client name, to allow accountants and clients to review tax return data and to allow accountants to promptly and accurately respond to client inquiries such as the status of the return, what additional information may be required, an amount of a refund or amount due, etc, rather than informing the client that the client will have to wait until the accountant returns to the office to check on the client's tax return, thereby enhancing service provided to the client and providing convenience to the accountant.

Further, with embodiments, the client and/or accountant can generate and send an electronic message related to the tax return. For example, the accountant may send a self-reminder from the mobile communication device to the computer utilized to prepare the tax return when the accountant is away from the office. More specifically, when a client calls the accountant asking about a tax return, the accountant can then generate a message indicating which client called and the nature of the inquiry and send the message to, for example, the computer utilized to prepare the tax return. The message is waiting for the accountant when the accountant returns to the office such that the accountant does not forget which client called and why the client called, which can be particularly beneficial to accountants who have a large number of clients and to accountants who tend to be forgetful.

Thus, it is believed that embodiments provide the first mobile platform that provides mobile access to tax return data and that allows clients and accountants to generate messages related to important tax return data while they are on the go or at remote locations through a mobile communication device. In this regard, embodiments offer a new approach to accountant and client interactions and access to tax return data, which has traditionally been subject more limited disclosure and transmission due limitations and limited access to certain tax preparation programs and the personal and confidential nature of tax return data such as social security numbers, income, etc., which has and continues to be data that clients usually try to maintain secret or subjected to limited disclosure. Various system and method embodiments and aspects thereof are described in further detail with reference to FIGS. 1-20.

Referring to FIG. 1, a system 100 constructed according to one embodiment is configured or operable to provide mobile access to accounting or tax return data and includes or involves a first computer 110 of an accountant, Certified Public Accountant (CPA), attorney, tax professional or preparer 140 (generally, "accountant") who, for example, prepares a tax return 111 on behalf of a client 150 such as an individual taxpayer or other entity such as a corporation, partnership, trust, etc. (generally, "client"), a second, broker, facilitating, or intermediate computer or server 120 (generally, "second computer" 120) that may be managed or operated by a host 160, and a mobile communication device 130 of the accountant 140. Embodiments are described with reference to preparation of a tax return 111 and tax return data 112, but embodiments may also apply to financial management programs and accounting data, e.g., accounting data generated using QuickBooks® and/or other financial management programs. Further, while embodiments are describe with reference to a mobile communication device 130 of an accountant 140, in other embodiments, the mobile communication device 130 may be a mobile communication device 130 of the client 150, or embodiments may involve mobile communication devices 130 of both the accountant 140 and the client 150. For ease of explanation, not limitation, reference is made to a mobile communication device 130 of the accountant.

The first computer 110 is at a first location 115 (represented by dashed boundary line), which may be a fixed location such as an office of the accountant 140 or other location where the first computer 110 is used to prepare the tax return 111. The first computer 110 is operably coupled to or in communication with the second computer 120 through a network 170a, and the second computer 120 is operably coupled to or in communication with the mobile communication device 130 through a network 170b. Each of the networks 170a-b and other networks discussed herein (generally, network 170) may be different, or two or more networks 170 may be the same depending on the system configuration and communication protocols employed. One or more or all of the networks 170 may be, for example, a wireless or cellular network (e.g., for communications between the mobile communication device 130 and the second computer 120), a Local Area Network (LAN) and/or a Wide Area Network (WAN). Reference to a network 170 generally is not intended to refer to a specific network or communications protocol, and embodiments can be implemented using various networks 170 and combinations thereof.

The mobile communication device 130 is at a second location 135 (represented by dashed line) that is remote relative to the first location 115. A "remote" location is defined as a location at which the accountant 140 cannot access the first computer 110 to access or view the tax return 111 of the client 150. Thus, a "remote" location 135 may be a different location within the accountant's office (e.g., on a different floor, in a conference room, etc but at a location other than at the first computer 110). A "remote" location 135 may also be a location outside of the office, e.g., at another client, a restaurant, an airport or while the accountant 140 is in a car, train or other form of transportation.

The accountant 140 utilizes a tax preparation program 113 that executes on the first computer 110 (or an on-line version of the tax preparation program 113) to prepare the tax return 111 on behalf of the client 150. The tax return 111 includes various types of tax return data 112 such as the client 150 name, the status of the tax return 111 (e.g., whether incomplete, filed, rejected, etc.), an amount of a refund or amount due, information that is required to complete the tax return 111, etc. Examples of known tax preparation programs 113 that may be utilized in embodiments include professional and consumer tax preparation programs include Lacerte®, ProSeries®, TurboTax® ProLine™ Tax On-Line, programs available from Thomson Reuters, CCH and Drake Software and other tax and financial management programs.

The second computer 120 may be a computer or server of a host 160 and that may serve as, or be in communication with, an electronic filing system or server that functions as a "clearing house" for formatting and transmitting completed electronic tax returns 111 to a computer (not shown in FIG. 1) of a tax authority. The host 160 may be, for example, Intuit Inc. that provides a second computer 120 or server of the Intuit Electronic Filing Center for electronically filing tax returns 111 or other hosts 160 that provide tax preparation programs 113 and electronic filing servers. The tax authority may be a federal tax authority (e.g., Internal Revenue Service), a state tax authority and other tax collecting entity (generally, "tax authority").

The second computer 120 hosts a synchronization program or application 122 (generally, "synchronization program") (illustrated as "Sync" in FIG. 1) and a mobile access or download application 124 (illustrated as "App" in FIG. 1). The mobile communication device 130 includes a keypad or other data entry device 131 (generally, "keypad") and a display screen 132. Examples of mobile communication devices 130 that may be utilized in embodiments include, for example, a cellular telephone and a Smartphone such as the iPhone®, available from Apple, Inc. and various other communication/computing devices such as the iPad®, also available from Apple, Inc. and other tablet or tablet-like devices that are not utilized to prepare the tax return. iPhone® and iPad® are registered trademarks of Apple, Inc.

Figure 2:
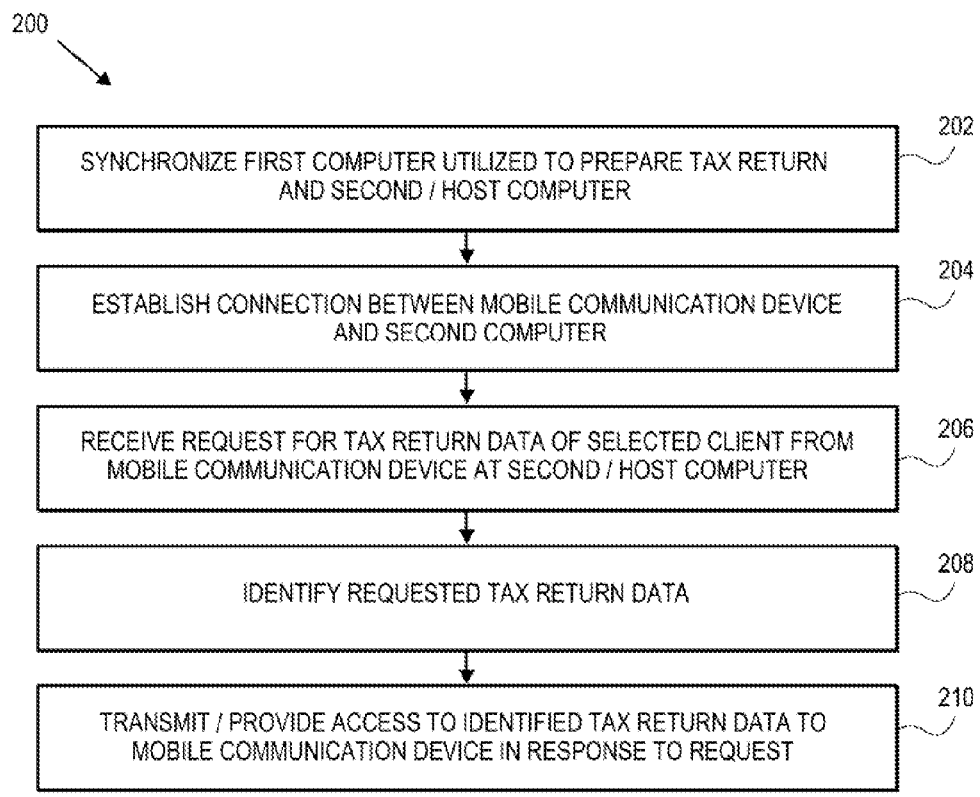
FIG. 2 is a flow diagram of an embodiment of a method for providing mobile access to tax return data.

Referring to FIG. 2, a method 200 for providing tax return data 112 to the mobile communication device 130 comprises, at step 202, synchronizing the first computer 110 utilized to prepare the tax return 111 and the second computer 120. At step 204, a connection between the mobile communication device 130 and the second computer 120 is established through network 170b. At step 206, the second computer 120 receives a request for tax return data 112 of the client 150 (or of a selected client 150 if the first and second computers 110, 120 are synchronized with tax return data 112 of multiple clients 150) from the mobile communication device 130 at the second computer 120, which identifies tax return data 112 hosted by the second computer 120 at step 208, and provides access to or downloads the tax return data 111 from the second computer 120 to the mobile communication device 130 such that tax return data 111 can be viewed by the accountant 140 using the mobile communication device 130. Further aspects of system 100 and method 200 embodiments and other embodiments are described with reference to FIGS. 3-20.

Figure 3:
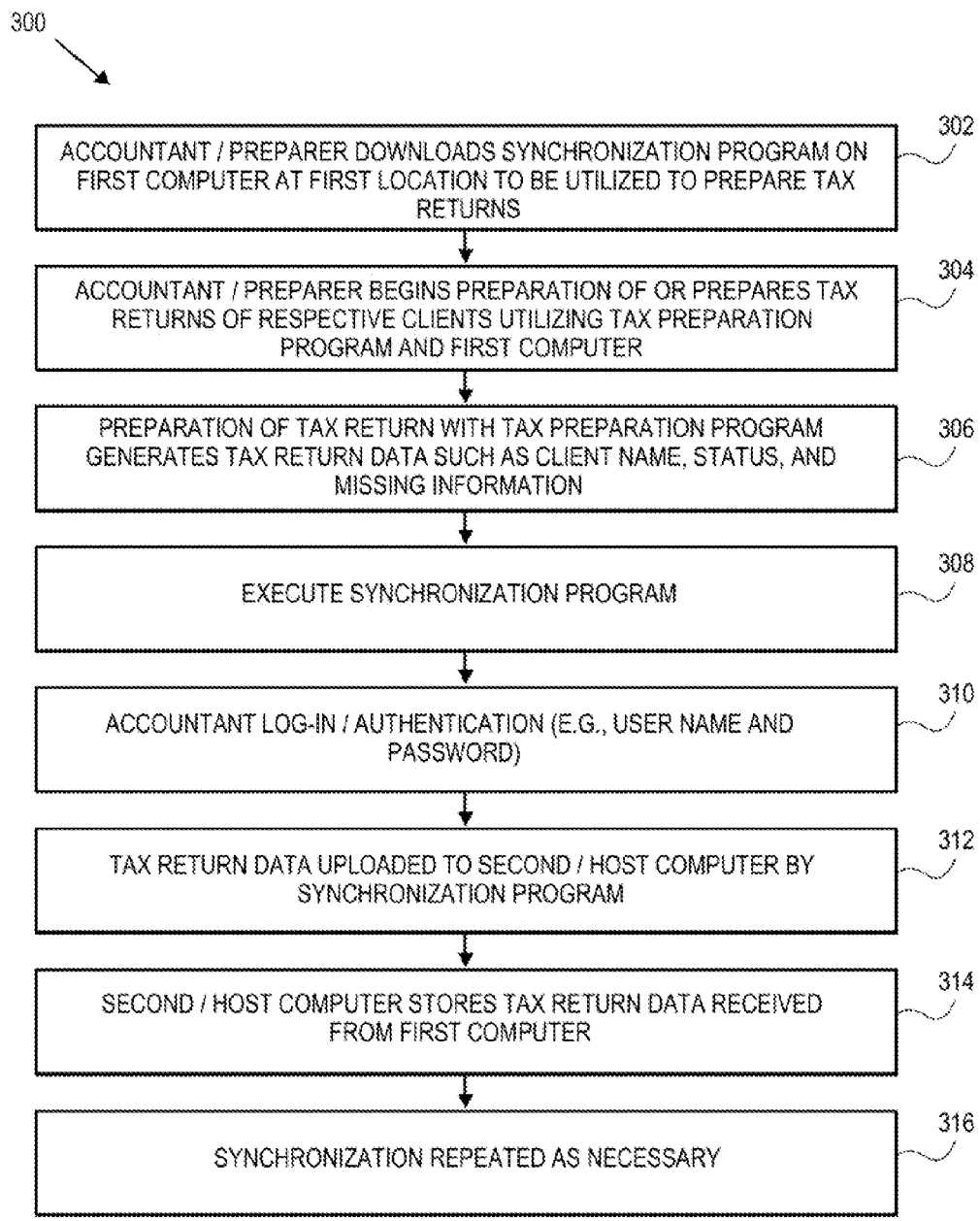
FIG. 3 is a flow diagram of an embodiment of a method for providing mobile access to tax return data.

Referring to FIG. 3, a method 300 for providing tax return data 112 to the mobile communication device 130 comprises synchronizing the first computer 110 and the second computer 120. Synchronization involves, at step 302, the accountant 140 downloading (if not already downloaded) the synchronization program 122 onto the first computer 110 utilized to prepare the tax return 111 and from the second computer 120 (as shown in FIG. 1) or from another source. FIG. 1 illustrates the synchronization program 122 already downloaded onto the first computer 110.

At step 304, which may or may not follow step 302, the accountant 140 begins preparation of or prepares at least a portion of a tax return 111 on behalf of one or more clients 150 utilizing the tax preparation program 113 and the first computer 110. The tax preparation program 113, at step 306, includes or generates tax return data 112 such as personal identification information including client 150 name and social security number, and data relating to the tax return 111 such as status and whether certain information is required to complete the tax return 111.

Figure 4:
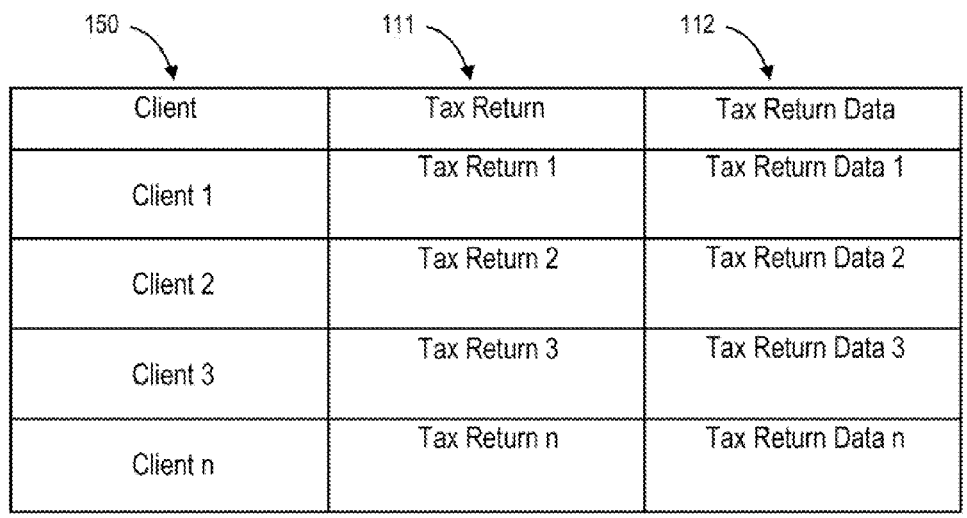
FIG. 4 generally illustrates tax returns of different clients having different tax return data.

For example, as generally illustrated in FIG. 4, the accountant 140 may represent multiple clients 150n and the tax preparation program 113 is utilized to prepare respective tax returns 111n for respective clients 150n, and each tax return 150n has different tax return data 112n. Tax return data 112 in the form of status may indicate the status of the tax return 111, e.g., filed, rejected, incomplete, etc. For example, referring to FIG. 5A, a tax preparation program 113 such as Lacerte® may generate status data 502 such as "irs rejected," "federal rejected," "rejected by the irs," "state rejected," "ready to send," etc.

Figure 6:
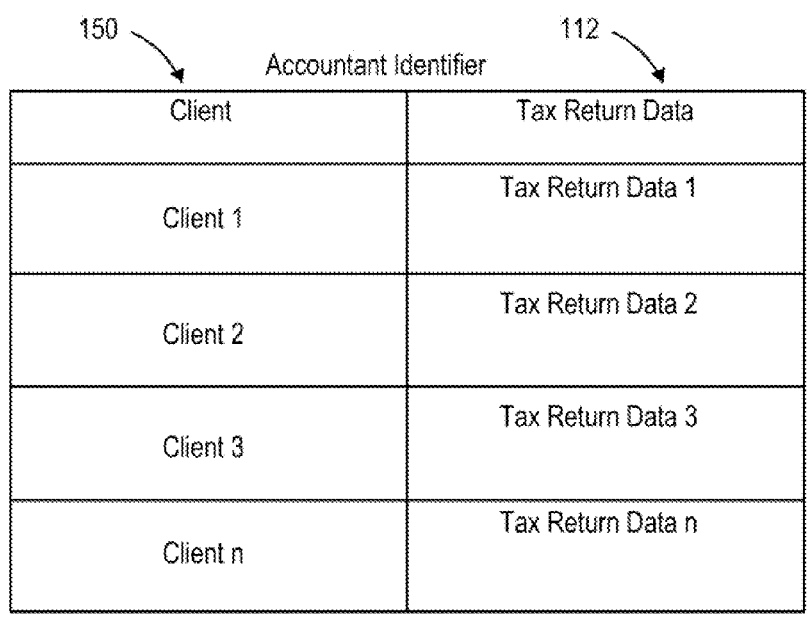
FIG. 6 generally illustrates tax return data of different clients being stored on the second or host computer based at least in part upon a unique identifier of the accountant.

Referring again to FIG. 3, at step 308, the synchronization program 122 is executed, and at step 310, requests the authentication or log-in information from the accountant 140. The accountant 140 may log-in by entering a user name 117 and password 118 with the first computer 110. When using a tax preparation program 113 such as Lacerte®, the user name 117 may be an Intuit workplace ID that may, for example, be an e-mail address of the accountant 140 utilized to register with a host 160 such as Intuit Inc. that provides tax preparation programs 113 such as Lacerte® and services including electronic filing of tax returns. Assuming the log-in 117 and password 118 are correct, a connection is established between the first computer 110 and the second computer 120, and at step 312, respective tax return data 112 of respective tax returns 111 is uploaded to the second computer 120 by the synchronization program 122. At step 314, the second computer 120 stores the received tax return data 112, e.g., in a table or other format as generally illustrated in FIG. 6 according to a unique identifier such as client 150 name, social security number or another identifier such as the user name, Intuit workplace ID or an e-mail address. The second computer 120 may host tax return data 112 for one or multiple accountants 140 based on such identifiers or other criteria.

Referring again to FIG. 3, at step 312, at a later time, the first computer 110 and the second computer 120 may be synchronized again by the first computer 110 transmitting tax return data 112 to the second computer 120. Synchronization repeated periodically (e.g., hourly, daily or weekly) or in response to a change of the tax return data 112 or an action such as a browser refresh or log-in by the accountant 140. Thus, all of the tax return data 112 of respective tax returns 111 may be uploaded to the second computer 120 to synchronize the first and second computers 110, 120. The accountant 140 may also select only certain clients 150 whose tax return data 112 should be uploaded to the second computer 120 or only certain tax return data 112 of clients 150 that should be uploaded. Further, the accountant 140 may select certain types of tax return data 112 of selected clients 150 to be uploaded. The synchronization program 122 may act upon all clients 150, all tax return data 112, or only certain clients 150 and/or tax return data 112 selected by the accountant 140. Further, the synchronization program 122 may be programmed to only upload certain pre-determined types of tax return data 112 from the first computer 110 to the second computer 120, e.g., types of data that are considered the most important or commonly needed by accountants 140 when away from the office. For ease of explanation, reference is made generally to "tax return data" that is uploaded to the second computer 120 by the synchronization program 122.

Figure 7:
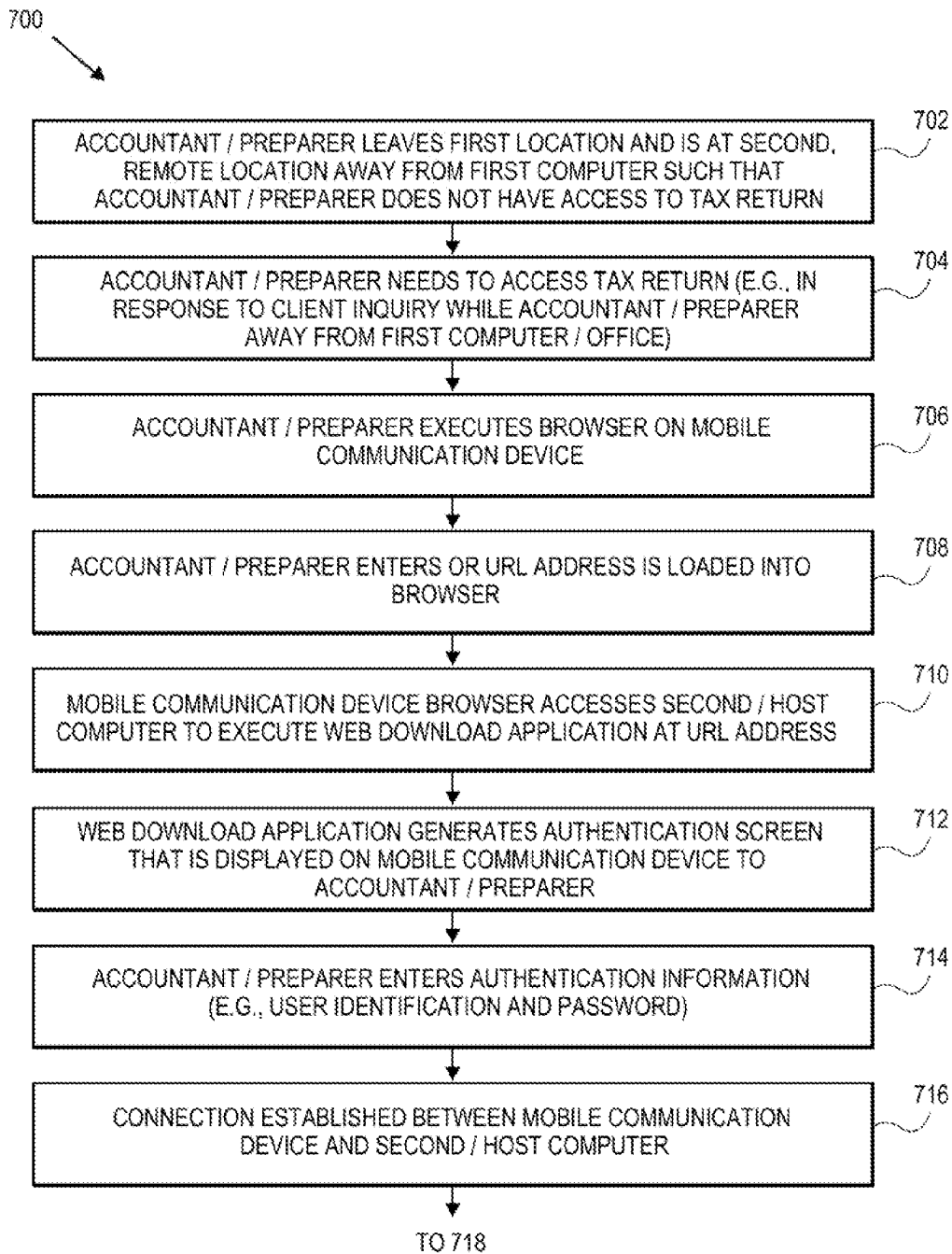
FIG. 7 is a flow diagram illustrating how synchronized data can be accessed using a browser executing on the mobile communication device and a web application hosted by the second or host computer.
Figure 7:
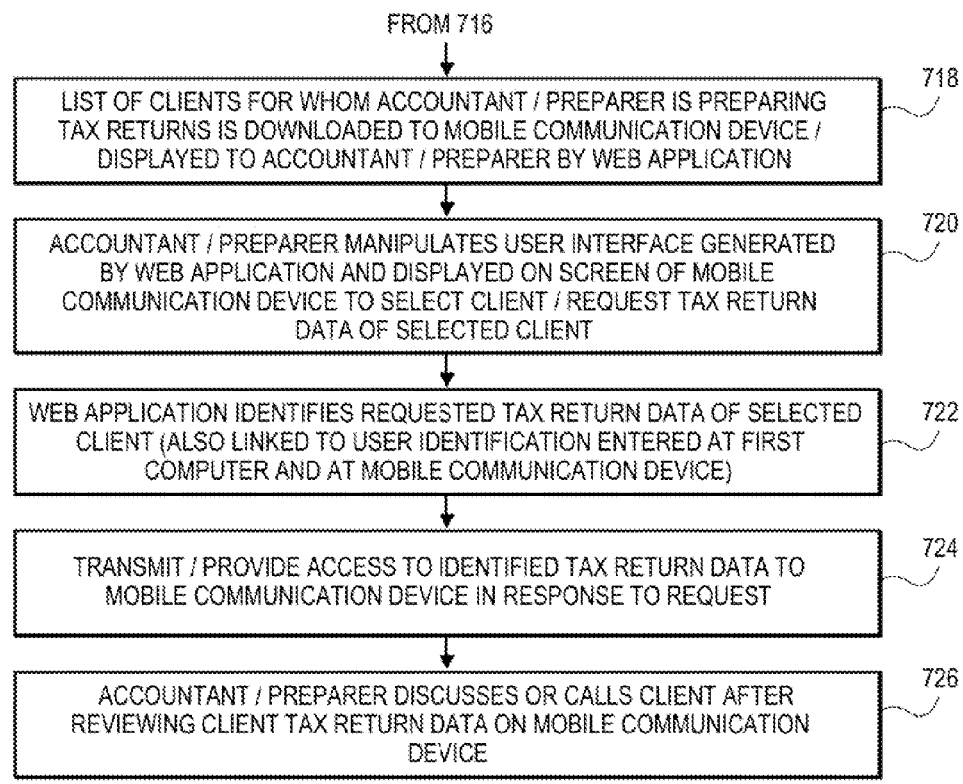

Referring to FIG. 7, a method 700 for utilizing a mobile communication device 130 to access, view or download tax return data 112 from a remote location involves, at step 702, the accountant 140 leaving the first location 115 that includes the first computer 110 utilized to prepare the tax return 111 and arriving at the second location 135 that is remote relative to the first location 115. The accountant 140 may be out of the office or at a meeting. At step 704, the accountant 140 has a need to access a tax return 111 of a client 150. For example, the client 150 may call the accountant 140 while the accountant 140 is out of the office asking about the tax return 111, e.g., status of the tax return 111, an amount of a refund or amount owed and whether any additional information is required to complete the tax return 111.

Rather than telling the client 150 that the client 150 will have to wait until the accountant 140 returns to the office, the accountant 140 executes a browser 133 on the mobile communication device 130 at step 706. A web address or Uniform Resource Locator (URL) address 126 of the mobile access application 124 on the second computer 120 is entered by the accountant 140 into the mobile communication device 130 or loaded, e.g., from a bookmark, at step 708. In the illustrated embodiment, the mobile access application 124 that is used to provide mobile access to tax return data 112 with the mobile communication device 130 is a web application that can be loaded by any mobile communication device 130. In other embodiments, a native application of the mobile communication device 130 can be used for this purpose. At step 710, the mobile communication device browser 133 accesses the second computer 120 to execute the mobile access application 124 at the URL address 126.

Figures 8, 9:
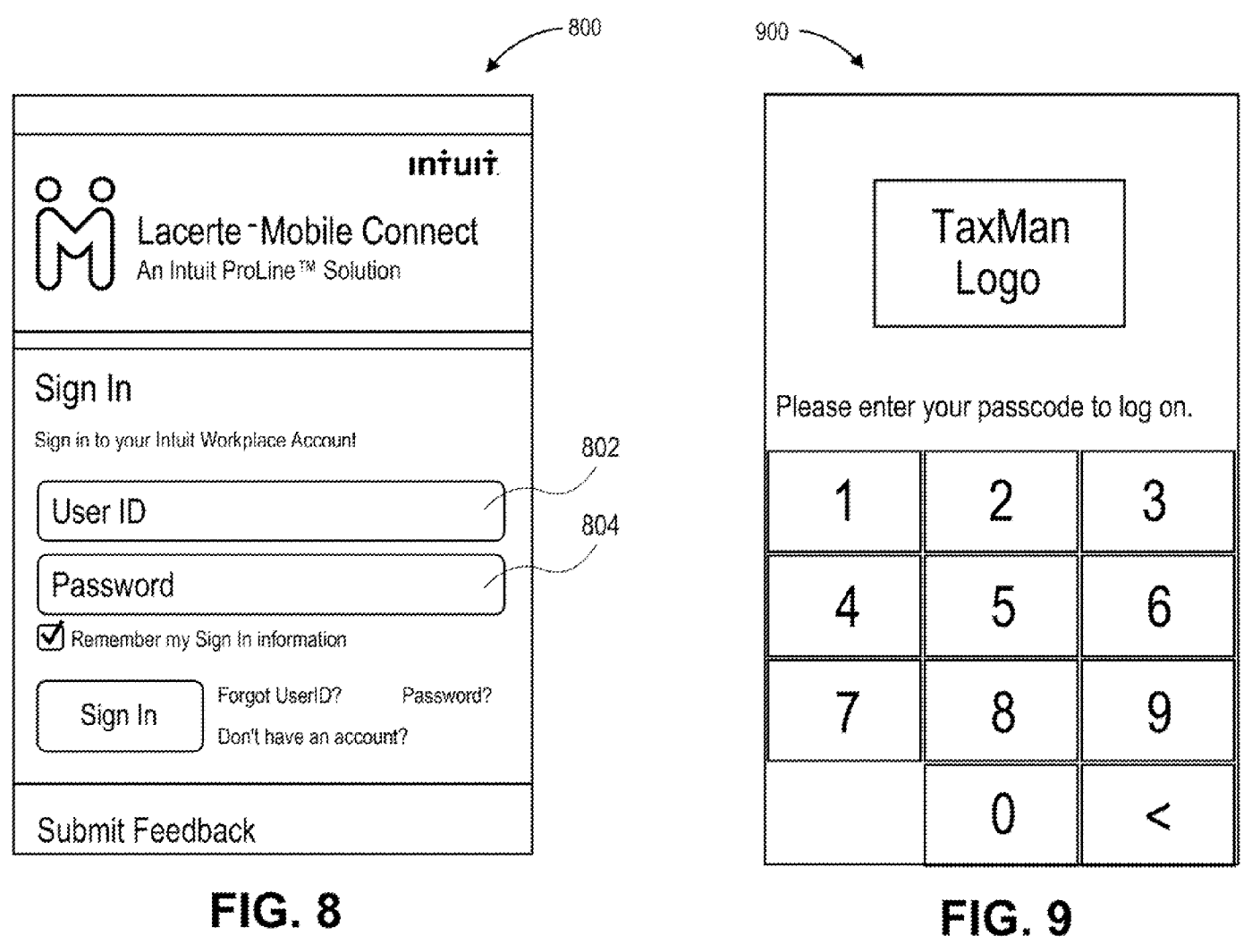

At step 712, and with further reference to FIGS. 8 and 9, the mobile access application 124 generates an authentication or log-in screen 800 that is displayed on mobile communication device 130 to accountant 140. In the illustrated embodiment, the mobile access application 124u is part of a mobile access service called Lacerte® Mobile Connect of Intuit Inc. and that is utilized with Lacerte®. It should be understood, however, that embodiments may involve other tax preparation programs 113 and financial management programs, and the log-in screens 800 discussed herein are provided as examples of how embodiments may be implemented.

At step 714, the accountant 140 enters a user identification 802 and password 804 (e.g. using the keypad 900 shown in FIG. 9), which may be the same identification and password 117, 118 (e.g., an accountant 140 name, e-mail address or Intuit Workplace account if a tax preparation application such as Lacerte® is utilized) that were previously utilized by the accountant 140. This information may be stored by a cookie for when the accountant 140 accesses the second computer 120 again.

Referring again to FIG. 7, and with further reference to FIG. 10A, at step 716, an authorized connection is established between the mobile communication device 130 and second computer 120, and at step 718, the mobile access application 124 generates an interface 1000 that is displayed on the mobile communication device 130 and that includes tax return data 112 such as a list 1010 of clients 150 for whom the accountant 140 is preparing tax returns 111. In order to determine which tax return data 112 or which list of clients 150 can be downloaded, the synchronization program 122 and the mobile access application 124 may be linked by a unique identifier such that the log-in information 117, 118 and 802, 804 that was entered by the accountant 140 to upload tax return data 112 from the first computer 110 and to access the second computer 120 with the mobile communication device 130.

At step 720, the accountant 140 manipulates user interface 1000 generated by the mobile access application 124 and displayed on screen 132 to select a client 150, e.g. by client name 1002. The selection or click on the client name 1012 serves as a request for tax return data 112 for that particular client 150. One or more other pages may also be display to display the types of data for a selected client that are available to allow the accountant 140 to select types of data for a selected client. At step 722, the mobile access application 124 identifies requested tax return data 112 of the selected client 150 and provides access to the tax return data 112 via the browser 132 such that the requested tax return data 112 is displayed to the accountant 140 in response to the accountant 140 selecting or clicking the client name 1012. Identified tax return data 112 may also be transmitted to or downloaded to the mobile communication device 130. At step 724, the accountant 140 can then discuss the tax return 111 with the client 150 since the accountant 140 can view a single screen dashboard or snapshot of tax return data 112 on the mobile communication device 130 as a result of clicking the client name 1012 rather than telling the client 150 that the accountant 140 will have to call the client 150 back later to discuss the inquiry. Further aspects of this functionality are described with reference to FIGS. 10A-13C.

For example, with continuing reference to FIG. 10A, in one embodiment, the mobile access application 124 provides access or downloads tax return data 112 in the form of a list 1010 of client names 1012 to the mobile communication device 130. Referring to FIG. 10B, the accountant 140 may select client named 1012 "Dante Cassenego" in which case the mobile access application 124 is executed to provide access to or download other tax return data 112 of Dante Cassenego such as status ("info pending") 1014 and other information about the client 150 such as contact information 1016 (e.g., e-mail address), phone number and address.

As another example, referring to FIG. 11A, an interface 1100, which may be a single screen view, includes a list 1010 of client names 1012 is displayed together with text status indicators 1102 which, in the illustrated embodiment, appear below each client name 1012 (whereas in the embodiment illustrated in FIG. 10A, the client list 1010 included only client names 1012). The embodiment shown in FIG. 11A also allows the accountant 140 to search 1110 for client names 1012 by the first letter of their last names. Further, in the embodiment shown in FIG. 11A, the interface 1100 provides for animated browser navigation that is similar to Smartphones such as the iPhone® such that the accountant 140 can select an "arrow" 1120 to horizontally move a page or screen of the interface 1110 and open a new page or screen (e.g., as shown in FIG. 11B) that includes additional tax return data about the selected client 150.

Figures 11A, 11B:
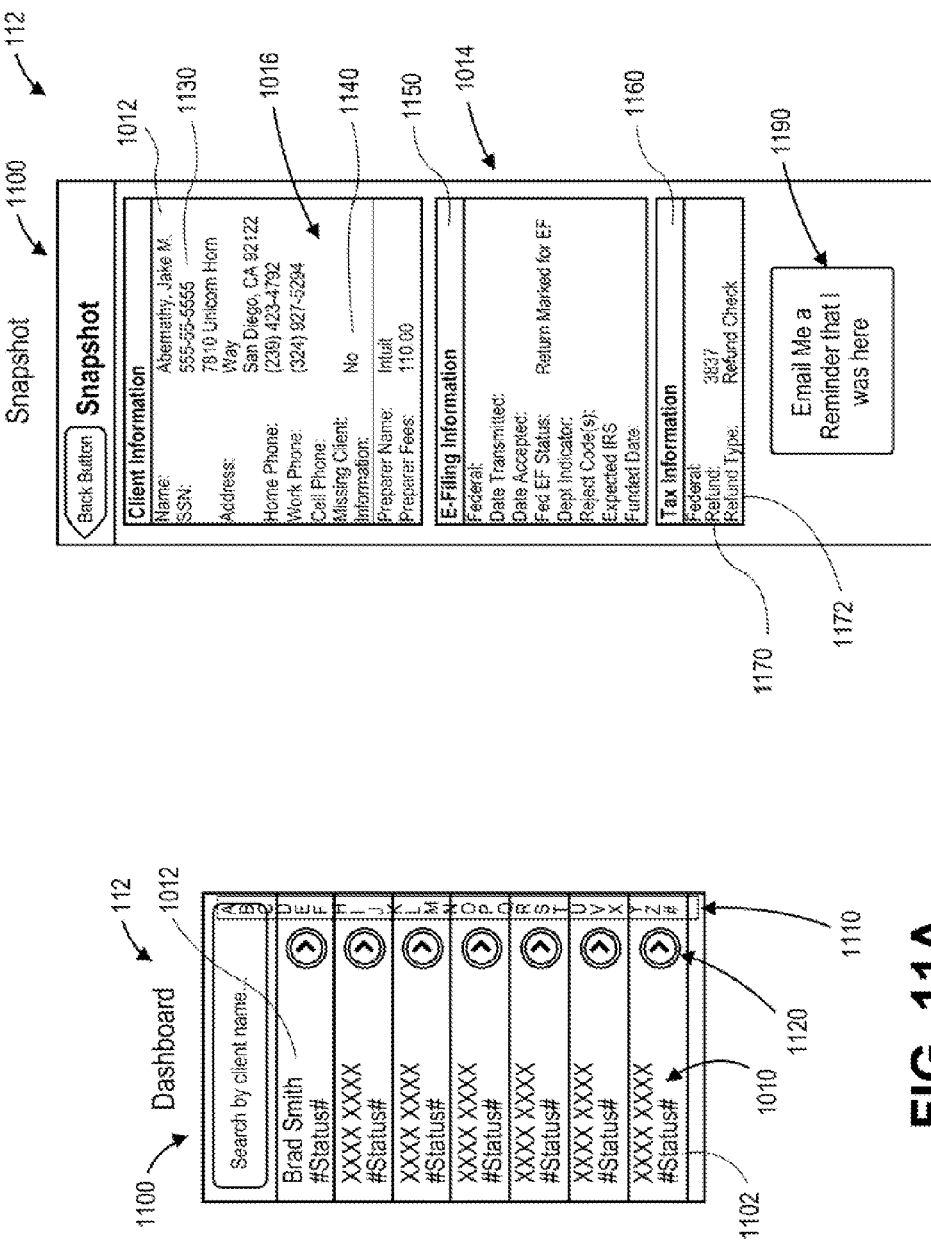

In the example illustrated in FIG. 11B, the tax return data 112 displayed to the accountant 140 on the mobile communication device 130 is more detailed than the embodiment illustrated in FIG. 10B and includes client 150 information including client name 1012, social security number 1130 (or last four digits thereof) and contact information 1016 including address, home phone and work phone. The tax return data 112 also includes an indication 1140 of whether any client 150 information is missing such that the client 150 must provide additional documents or information to the accountant 140 before the accountant 140 can complete the tax return 111. Further, in the illustrated embodiment, the tax related data 112 includes e-filing information 1150 which, in the illustrated example, involves e-filing information of a federal tax return and various status 1014 indicators such as transmission date, acceptance date, filing status (e.g., "Return Marked for EF"), and other indicators. Further, in the illustrated embodiment, the single screen snapshot of tax return data 112 includes tax information 1160 such as an amount of a refund and a form in which the refund will be provided to the client 150 (e.g., in the form of a check, electronic deposit, etc.). The tax information 1150 may also indicate an amount owed and how the amount owed is to be paid (e.g., check, credit card, electronic payment).

Figure 12A:
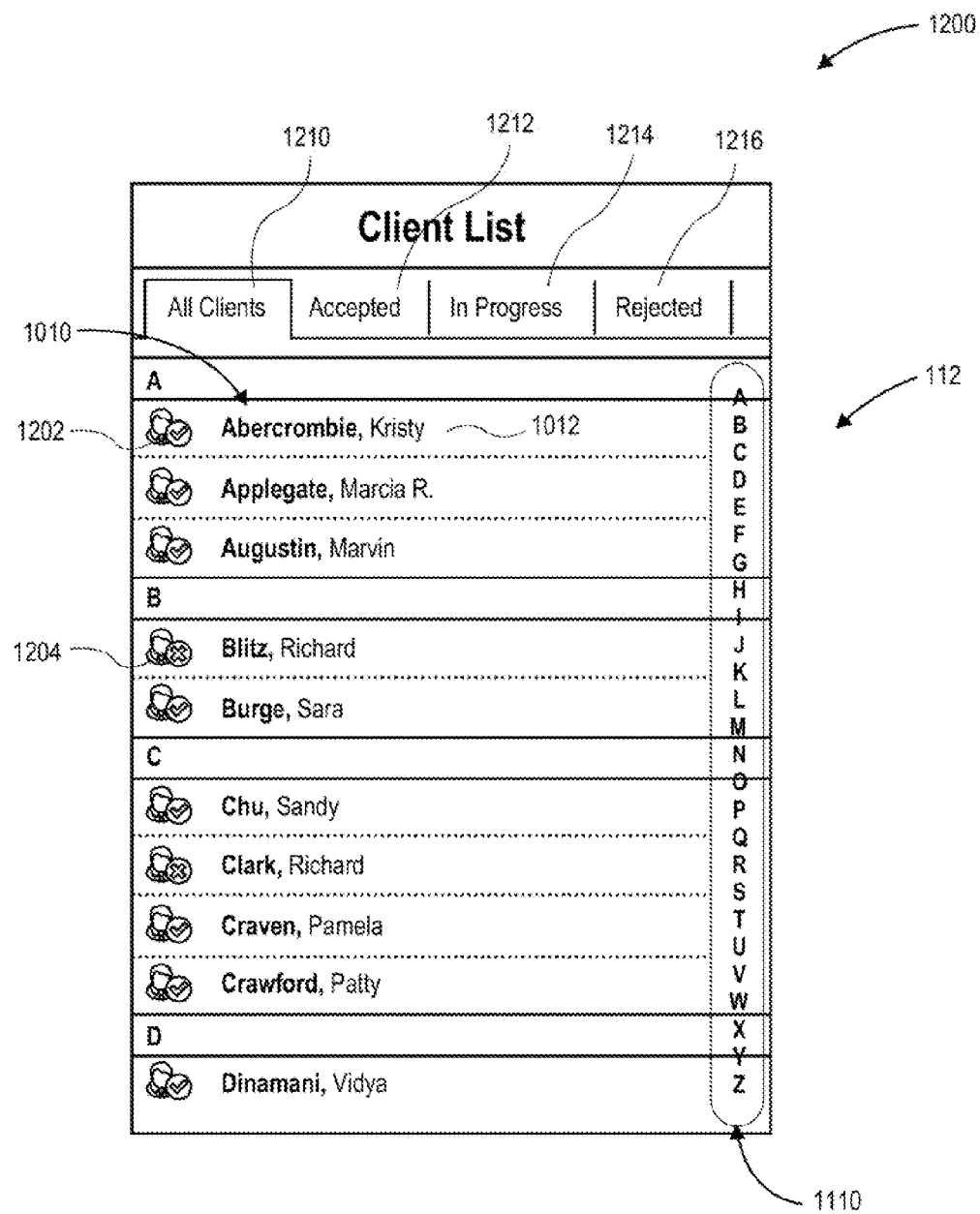
Figure 12B:
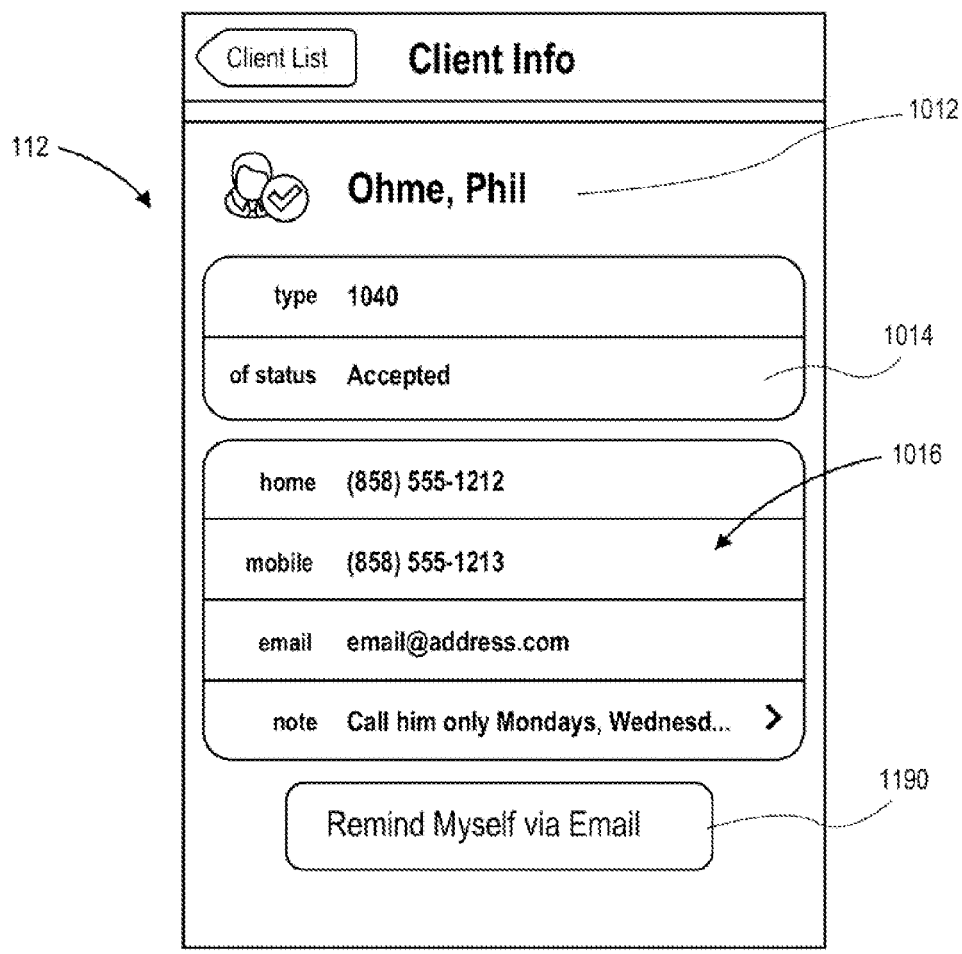

As a further example, referring to FIG. 12A, an interface 1200, which may be a single screen view, includes a list 1010 of client names 1012 displayed with respective status indicators in the form of visual indicators such as a "check mark" 1202 indicating that the tax return 111 was electronically filed and accepted by the tax authority and an "X" 1204 indicating that tax return 111 is not complete or was electronically filed and not accepted or that other action is required. Further, the interface 1200 includes tabs that can be selected to display different client lists. The "All Clients" tab 1210 (shows as selected in FIG. 12A) can be used to display a list 1010 of all of the clients 150 of the accountant 140. The list may or may not be presented within a single screen view. Selecting the "Accepted" tab 1212 generates a client list 1010 that includes names 1012 of clients 150 whose tax returns 111 have been accepted by the tax authority. Selecting the "In Progress" tab 1214 generates a client list 1010 that includes names 1012 of clients 150 whose tax returns 111 have not been completed. Selecting the "Rejected" tab 1216 generates a client list 1010 that includes names 1012 of clients 150 whose tax returns 111 have been completed and filed, but were rejected by the tax authority or for other reasons. Clicking on a client name 1012 (whether displayed by selecting tabs 1210, 1212, 1214 or 1216) displays tax return data 112 as shown in FIG. 12B. The interface 1200 shown in FIG. 12 also shows whether the client 150 will receive a refund 1170 which, in the illustrated example, the client 150 will be receiving a refund in the amount of $3837, and the form of payment 1172 is a check.

Figure 13C:
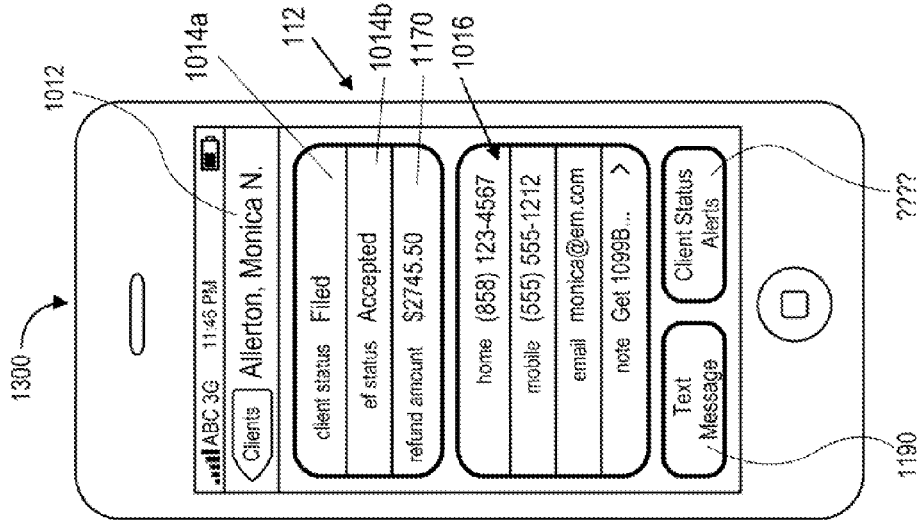
Figure 13B:
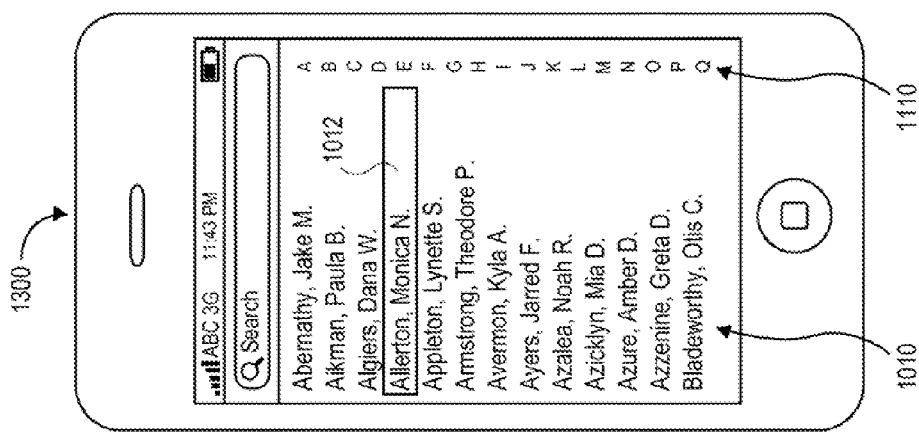
Figure 13A:
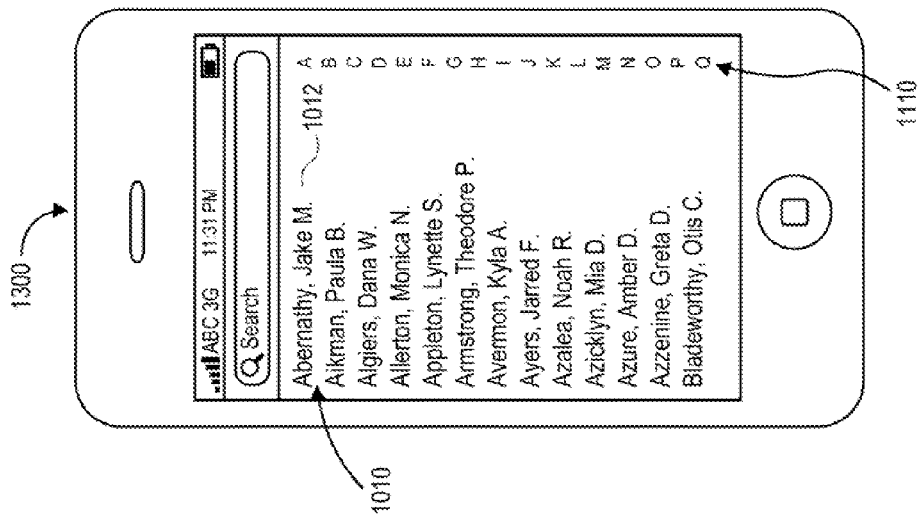

FIGS. 13A-C illustrate other interfaces 1300 that may be utilized with embodiments and that embody animated navigation for single click access to a plurality of different types of tax return data 112, e.g., using an iPhone or other Smartphone. The interface 1300 also displays status information 1014a and 1014b indicating client status (whether unfiled or filed) and electronic filing (ef) status (accepted or rejected) and a refund amount 1170. Further, the interface 1300 may provide for client alerts. With client alerts, rather than the accountant 140 reviewing tax return data 112 and verbally informing the client 150, client alerts allow the accountant 140 to approve of a direct notification where the client is automatically informed of any change to their status, e.g., via a SMS alert that pulls the mobile telephone number of a client from the tax preparation program 113 and uses that information to send the status updates.

Figure 5A:
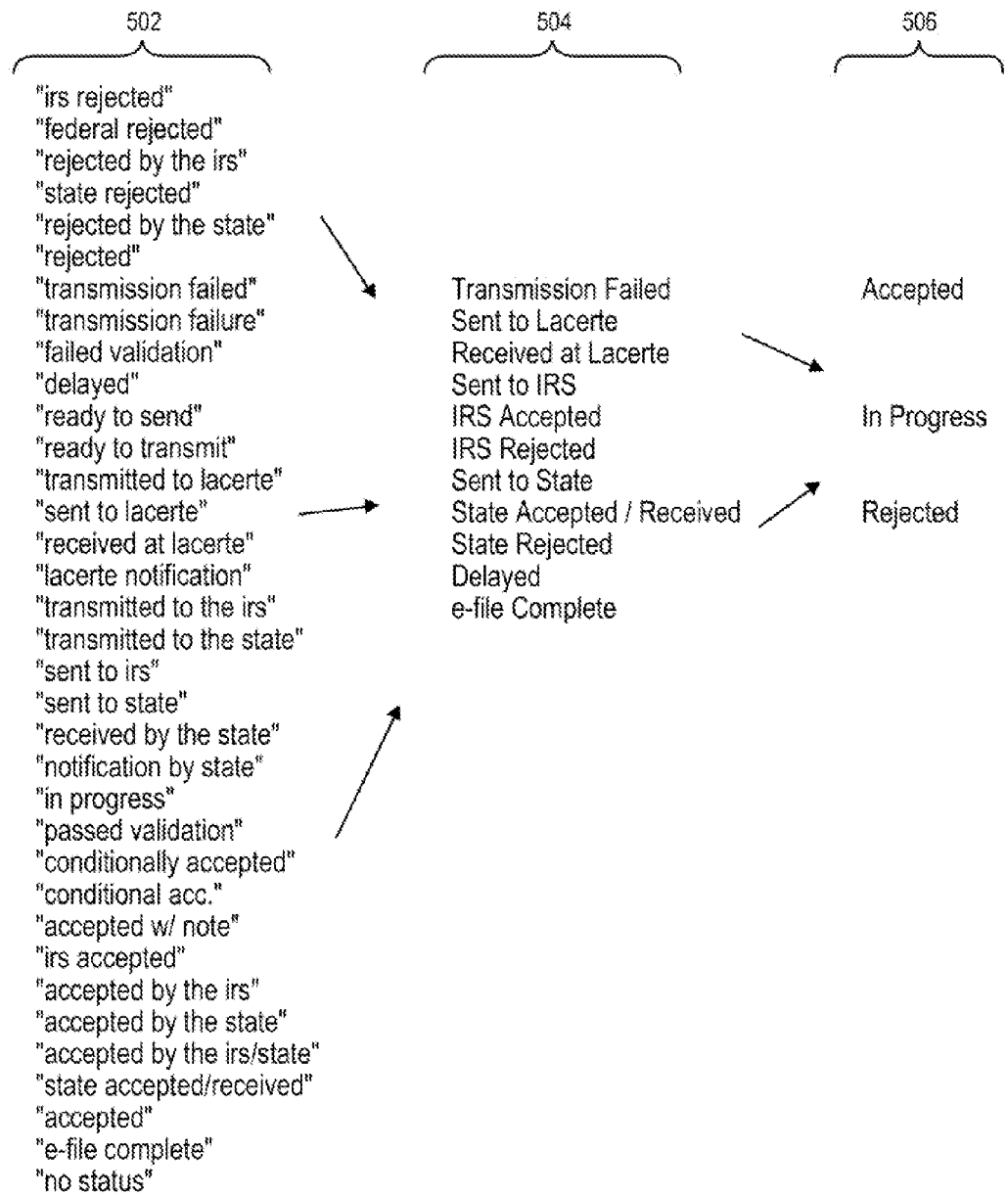
FIG. 5A illustrates examples of status indicators and how status indicators can be mapped to a smaller set of status indicators for display on a mobile communication device.
Figure 5B:
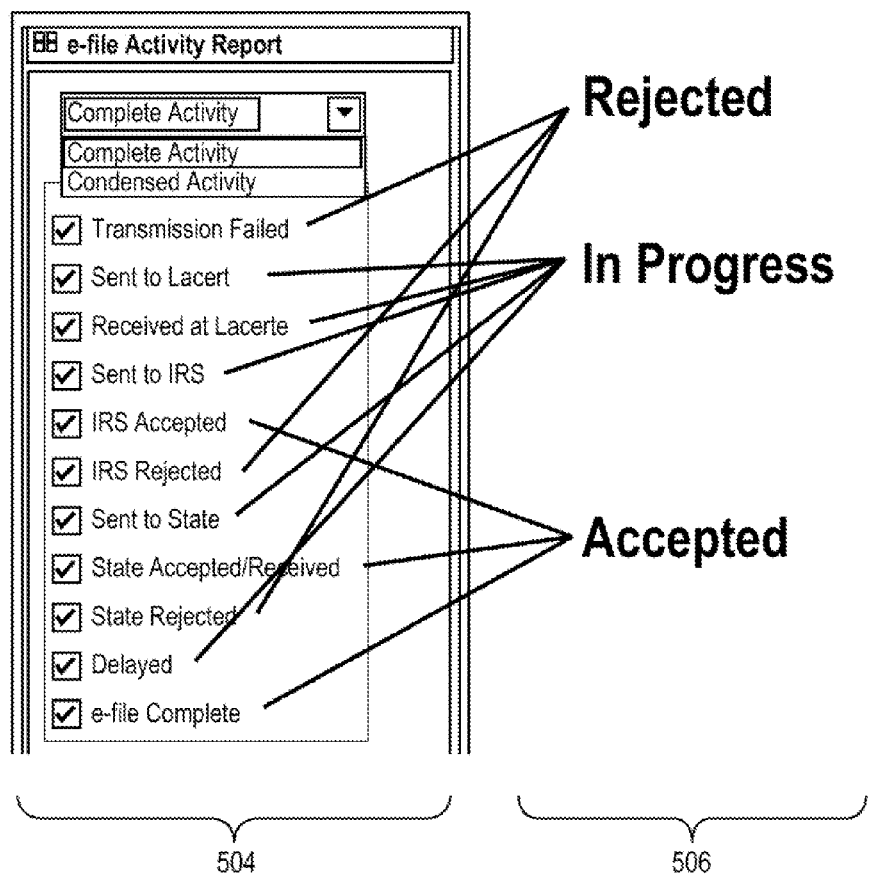
FIG. 5B further illustrates how status indicators can be mapped to a smaller set of status indicators for display on a mobile communication device.

Status indicators 1014 that are displayed may vary depending on embodiment implementations, the tax preparation program 113 utilized by the accountant 140 and whether and how status indicators of the tax preparation program 113 are mapped to a smaller set of status indicators 1014 to be displayed to the accountant 140 on the mobile communication device 130. For example, referring again to FIG. 5A, a tax preparation program 113 such as Lacerte® generates various tax return status indicators 502. For purpose of displaying tax return data 112 on the mobile communication device 130, it may be desirable to have a smaller number of status indicators in which case the standard set of status indicators 502 can be mapped or reduced to a smaller set 504 or, with further reference to FIG. 5B, an even smaller set of three status indicators 506 (accepted, in progress, rejected). For example, in the embodiment illustrated in FIGS. 12A-B and 13C, tax return data 112 comprising three status indicators 1014 ("Accepted," "In Progress" and "Rejected" as shown in FIG. 5B) are utilized, whereas embodiments illustrated in FIGS. 10B and 11B utilize different status indicators 1014. The particular status indicator 1014 utilized may vary and depend on, for example, the tax preparation program 113 utilized since different tax preparation programs 113 may have different status indicators and whether and the manner in which status indicators are mapped to a smaller set of status indicators. Thus, FIGS. 5A-C and 10A-13C are provided as examples of different status indicators 502, 504, 506, 1014 that may be used and how they may be determined or selected.

It should be understood that embodiments can be implemented with various interfaces and other manners of displaying and clicking client names 1012 to display various types of tax return data 112 on the mobile communication device 130. Thus, the embodiments illustrated in FIGS. 10A-13C are provided as illustrative and non-limiting examples of how embodiments may be implemented.

Further, it should be understood that embodiments may involve different numbers of accountants 140, clients 150, tax returns 111 and different types of tax return data 112 that is uploaded from computers utilized to prepare tax returns to the second or host computer, and then accessed by or downloaded to different mobile communication devices 130 of respective accountants 140. For example, embodiments may involve one accountant 140 who is preparing one tax return for one client 150 such that tax return data of that tax return of that client 150 can be accessed by the mobile communication of that accountant 140. Embodiments may also involve one accountant 140 who is preparing multiple tax returns for one client 150 such that the accountant 140 can access or download tax return data of one or more tax returns of that client 150 to the mobile communication device 130. Further, embodiments may involve one accountant 140 who is preparing one or more tax returns for each of a plurality of clients 150 such that the accountant 140 can select a client 150 from a list of clients 150 to access or download tax return data for the selected client 150 (e.g., as described above with reference to FIGS. 10A-13C).

Figure 14:
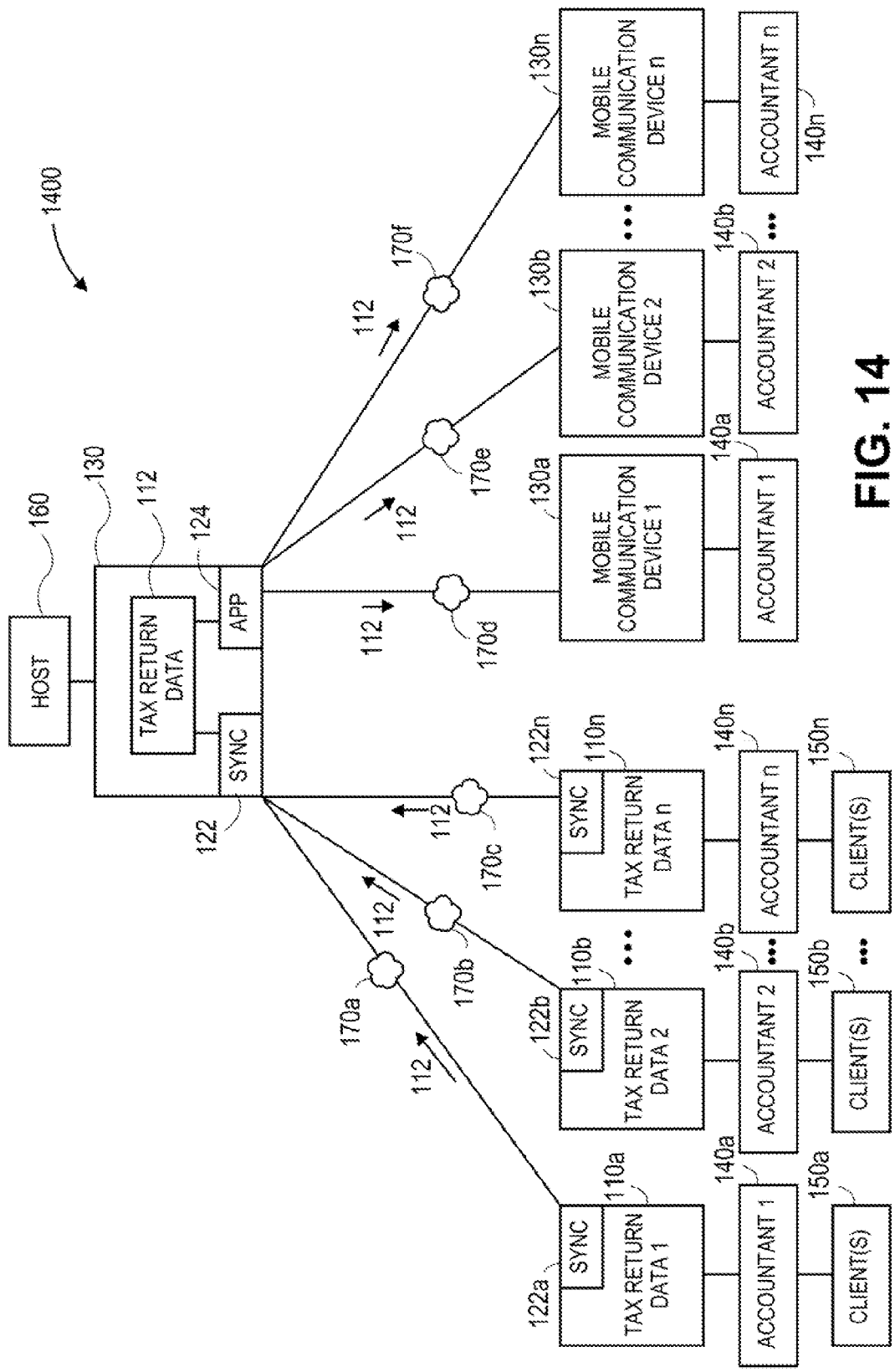
FIG. 14 illustrates a system constructed according to another embodiment for providing multiple accountants mobile access to their respective tax return data using their respective mobile communication devices.

Moreover, referring to FIG. 14, embodiments may involve a system 1400 including or involving multiple accountants 140a-n who are preparing one or more tax returns 111a-n for one or more respective clients 150a-n such that tax return data 112a-n generated by their respective tax preparation programs 113a-n executing on their respective computers 110a-n is synchronized with the second computer 120 and stored, e.g., according to a unique identifier such as name or e-mail address. Each accountant 140, using a mobile communication device 130 at a location that is remote relative to the computer 110 utilized to prepare their respective returns 111, executes a browser 132 on the mobile communication device 130 to establish a connection with the second computer 120. The mobile access application 124 is executed to allow each accountant 140 to select a client 150 from their list 1010 of clients to access, view or download tax return data 112 for the selected client name 1012 using their respective mobile communication devices 130.

For example, the second computer 120 may host tax return data 112 of three accountants 140 who work in San Diego. The first accountant 140a travels to Chicago and accesses tax return data 112a of one of his clients 150a using his mobile communication device 130a. The second accountant 140b travels in a car in Los Angeles and access tax return data 112b of one of her clients 150b using her mobile communication device 130b. The third accountant 140c is on a different floor of her office and away from her computer and access tax return data 112c of one of her clients 150c with her mobile communication device 130c.

Thus, it should be understood that embodiments may service one, ten, hundreds and thousands of accountants 140 at different locations and simultaneously and that the second or host computer 120 may provide access to or download respective tax return data 112 to one, ten, hundreds and thousands of mobile communication devices 130 at different locations and simultaneously. Accordingly, system embodiments 100 and 1400 described with reference to FIGS. 1 and 14 are intended to generally illustrate components of system embodiments and how they may be linked together and cooperatively utilized to perform method embodiments, but system and method embodiments may be implemented on much larger scales to serve accountants 140 in a particular geographic area and in various cities, states and countries.

Further embodiments, which may be implemented using embodiments described above with reference to FIGS. 1-14 in which a client name 1012 is selected and tax return data 112 of that client 150 is displayed on the mobile communication device 130, or independently of such embodiments, involves the accountant 140 generating and sending an electronic message, e.g., as a self-reminder, with the mobile communication device 130 when the accountant 140 is away from the office such that when a client 150 calls the accountant 140 asking about a tax return, the accountant 140 can then generate a message indicating which client 150 called and the nature of the inquiry and send the message to, for example, the computer used to prepare the tax return. Further aspects of messaging embodiments are described with reference to FIGS. 15-19.

Figure 15:
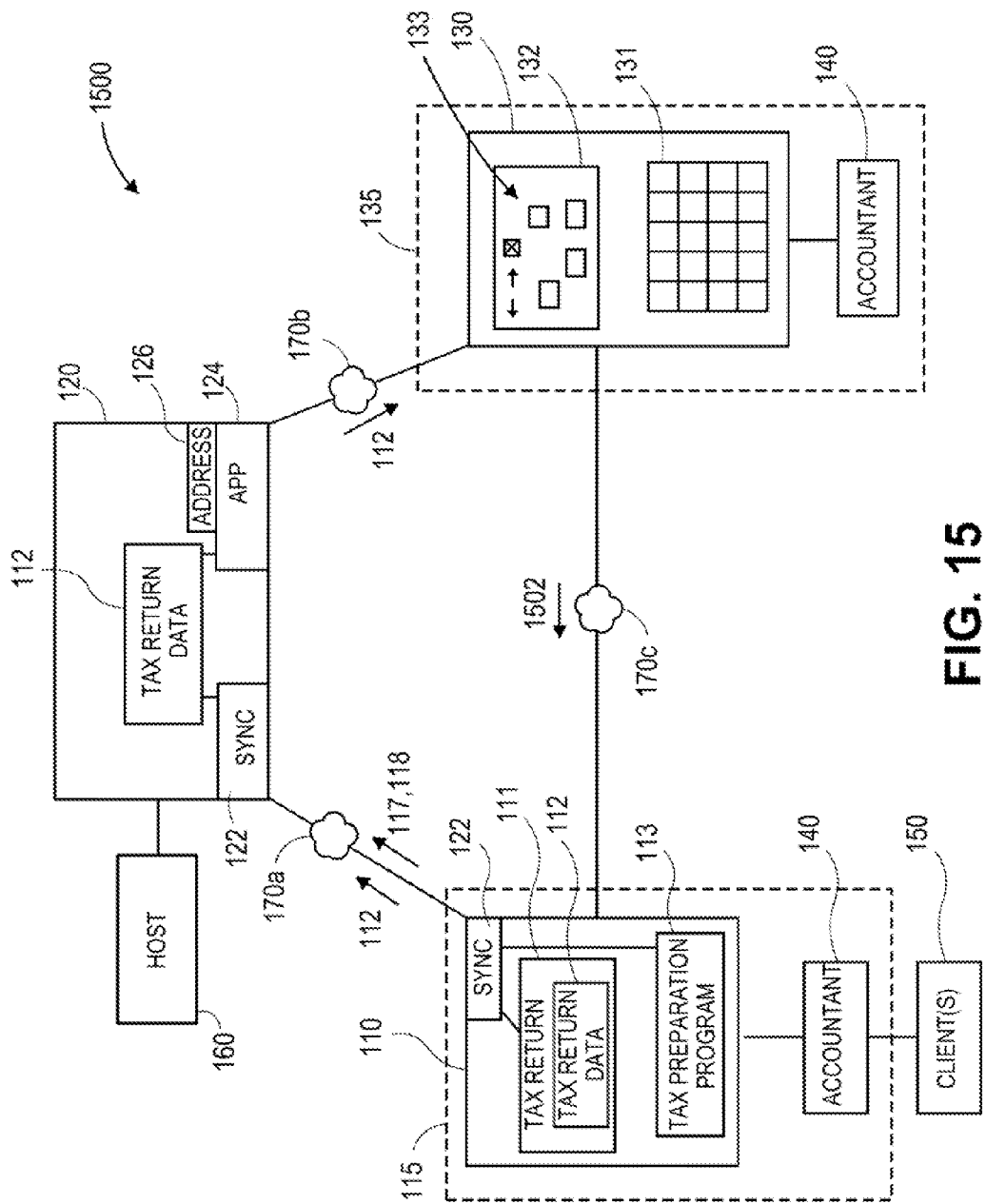
FIG. 15 illustrates a system constructed according to another embodiment for generating and sending messages related to tax return from a mobile communication devices to a computer utilized to prepare the tax return.
Figure 16:
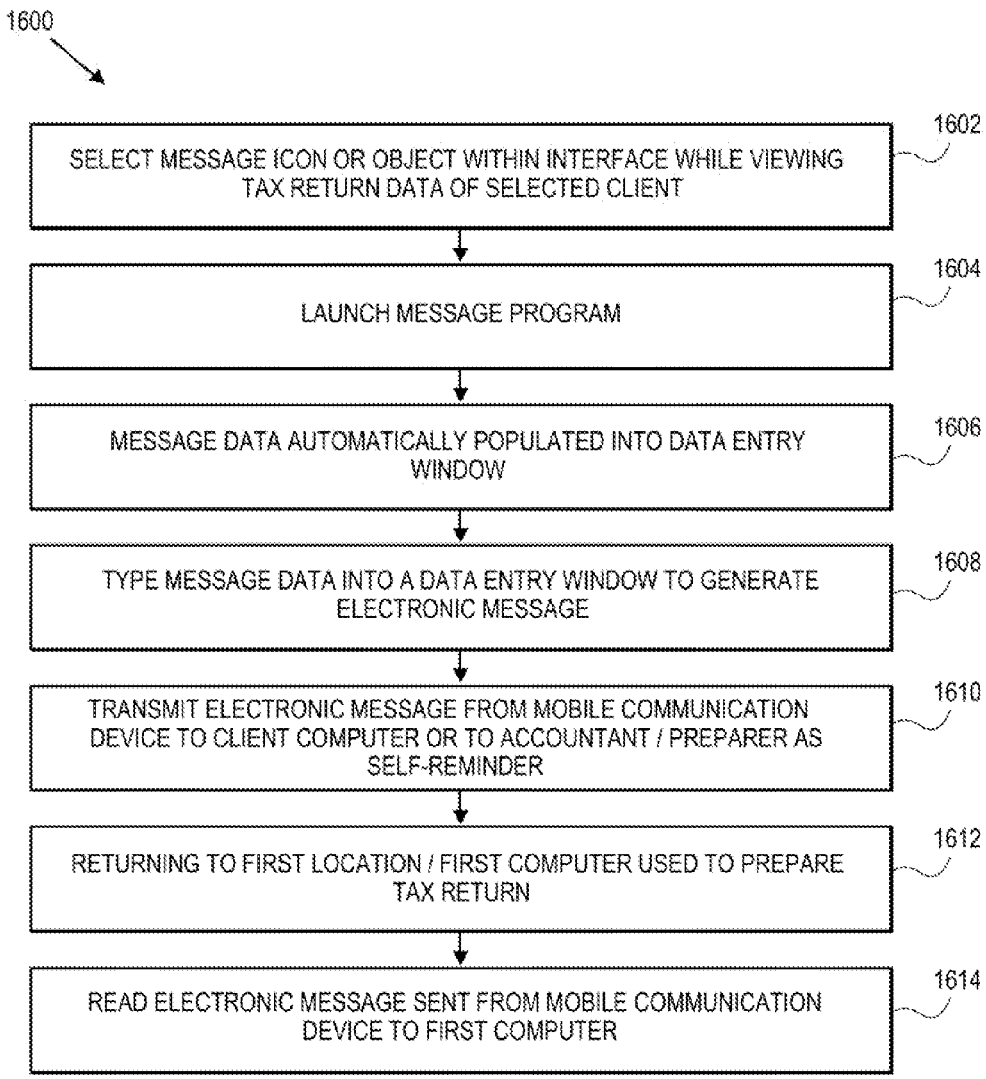
FIG. 16 is a flow diagram of one embodiment of a method for generating and sending messages related to tax return from a mobile communication devices to a computer utilized to prepare the tax return.

Referring again to FIGS. 11B, 12B and 13C, and with further reference to FIGS. 15-16, a system 1500 constructed according to one embodiment involves system components described with reference to FIG. 1 and also includes a network connection 170c between the mobile communication device 130 and the first computer 110. A method 1600 for using the system 1500 shown in FIG. 15 to generate and send electronic messages 1502 (such as electronic mail or Short Message Service (SMS) or text messages) related to a client 150 or tax return 111 from a mobile communication device 130 comprises, at step 1602, selecting a message icon or object 1190 within an interface displayed on the mobile communication device 130 which, in the illustrated embodiment, is provided in the same single screen or snapshot view as the other tax return data 112. For example, in the embodiment shown in FIG. 11B, the accountant 140 may select or click on the "Email Me a Reminder that I was here" icon or object 1190. As another example, referring to FIG. 12B, the accountant 140 may select or click on the "Remind Myself via Email" icon or object 1190. As yet another example, referring to FIG. 13C, the accountant 140 may select or click on the "Text Message" icon or object 1190.

Figure 17:
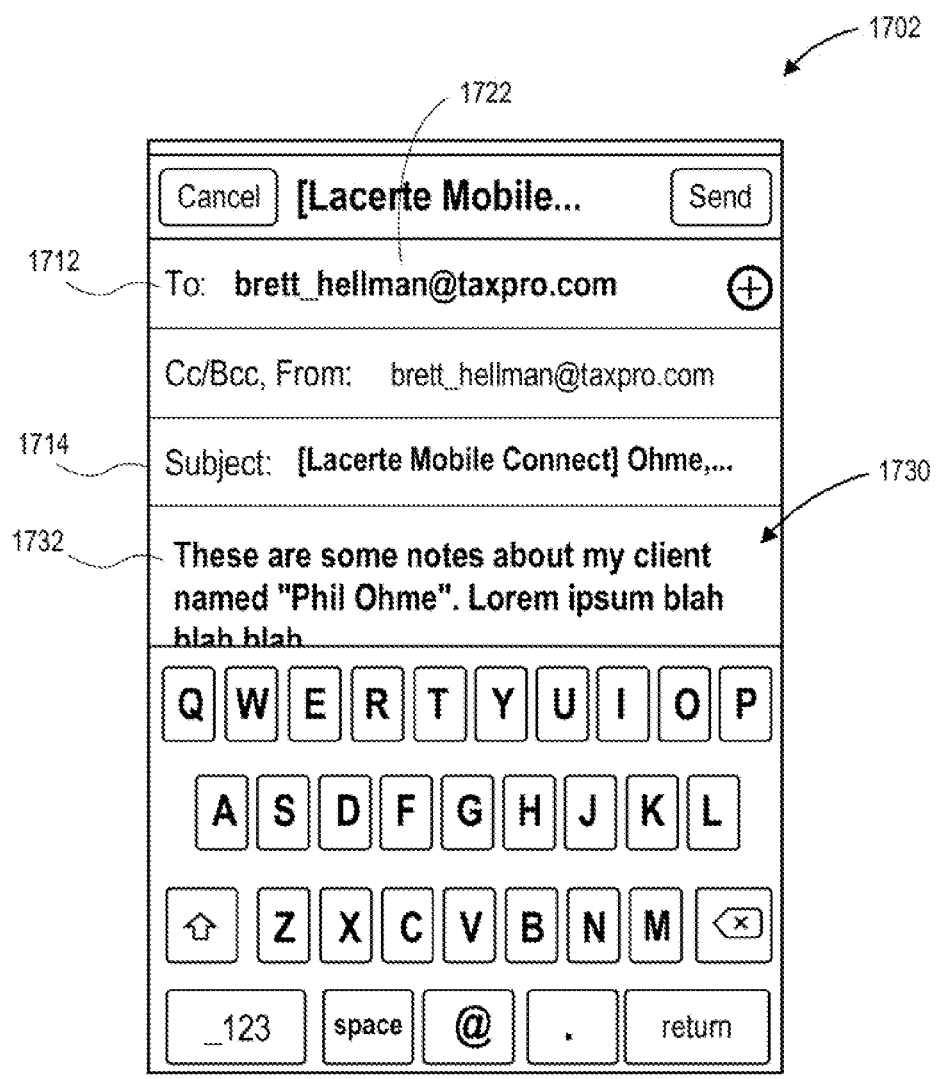
FIG. 17 illustrates an example of a message window or interface displayed on the mobile communication device, certain fields of which may be automatically populated with tax related data.

Referring again to FIG. 16, and with further reference to FIG. 17, at step 1604, a message program is launched on the mobile communication device 130, thereby generating a message window 1702, one example of which is shown in FIG. 17. The message program may be a native message program such as a native e-mail or text program on a mobile communication device 130 such as the iPhone. In other embodiments, a message program of the mobile access application 124 may be utilized.

According to one embodiment, at step 1606, certain fields of the message window 1702 are automatically populated with data such that the accountant 140 is not required to manually enter or type this data. For example, in one embodiment, the "To" field 1712 is automatically populated with an e-mail address 1722 which, according to one embodiment, is an e-mail address of the accountant 140 if embodiments are to be utilized by the accountant 140 to provide a "self-reminder" when the accountant 140 returns to the office at the first location 115. The e-mail address 1722 that is entered may be the same e-mail that was utilized for authentication or log-ins when uploading tax return data from the first computer 110 to the second computer 120 and when establishing a connection between the mobile communication device 130 and the second computer 120 (as described with reference to FIG. 8). According to another embodiment, the "Subject" field 1714 is automatically populated with data related to the client 150 or tax return 111 whose data 112 is being viewed by the accountant 140, e.g., the client 150 that was selected as described with reference to FIGS. 10A, 11A, 12A and 13A. In the illustrated embodiment, the Subject field 1714 is automatically populated with a client name 1012. In another embodiment, both of the "To" and "Subject" fields 1712, 1714 are automatically populated. In other embodiments, one or more of these fields 1712, 1714 is not automatically populated.

Referring again to FIG. 16, and with continuing reference to FIG. 17, at step 1608, the accountant 140 types a message 1732 into message field 1732 of the data entry window 1702 and at step 1610, in one embodiment, the electronic message 1732 is transmitted from the mobile communication device 130 to client 150 computer or to accountant 140/preparer as self-reminder. Other embodiments may involve sending the message 1732 to another recipient or one or more additional recipients.

Figure 18:
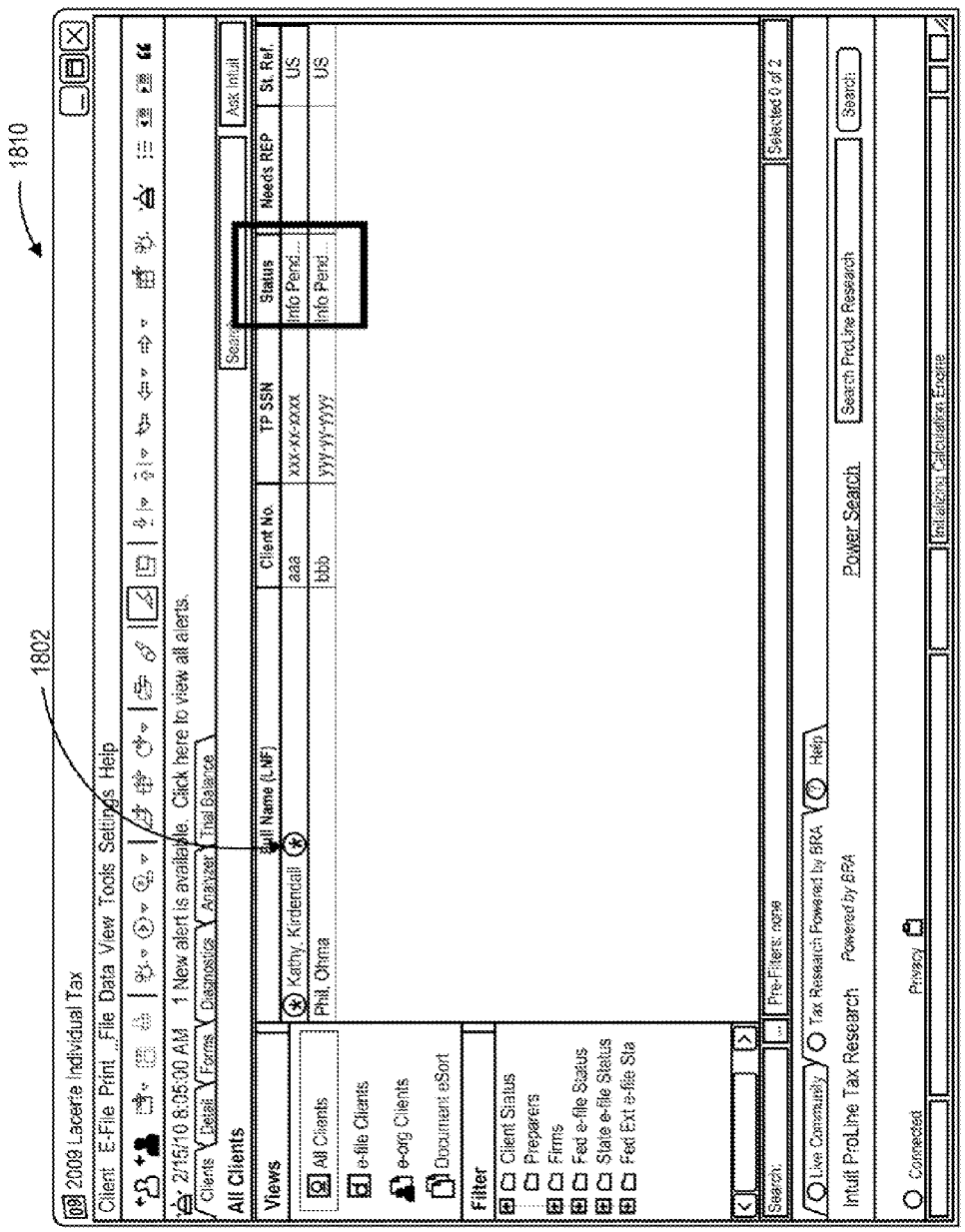
FIG. 18 illustrates one embodiment in which a client name within a screen generated by a tax preparation application is highlighted or indicated as a result of receiving an electronic message from the mobile communication device at the first computer on which the tax preparation program executes to prepare the tax return.
Figure 19:
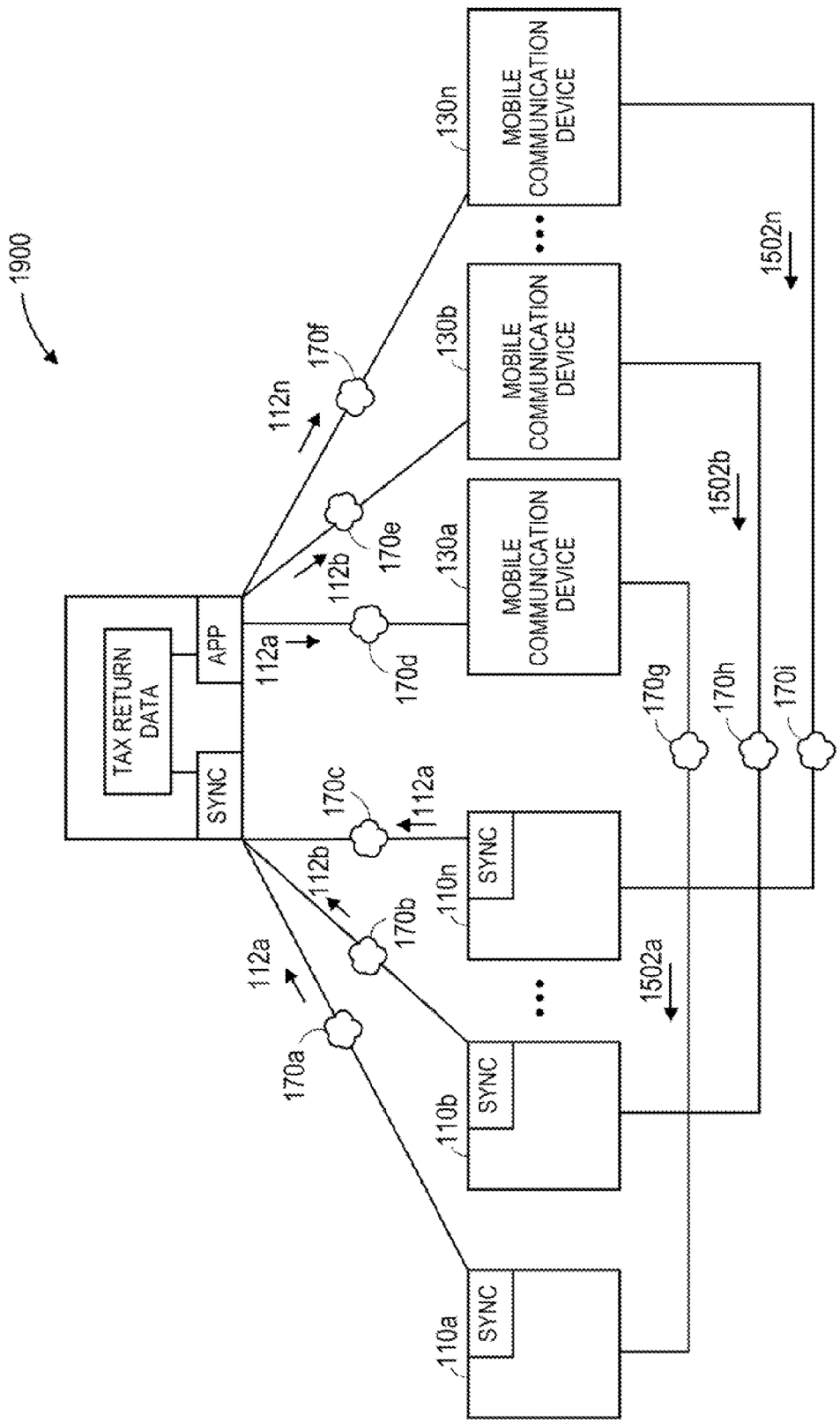
FIG. 19 illustrates a system constructed according to another embodiment in which multiple accountants generate and send respective messages related to tax return from respective mobile communication devices.

At step 1612, the accountant 140 leaves the second, remote location 135 and returns to the first location 115 at which the first computer 110 that was utilized to prepare the tax return 111 is located. For example, the accountant 140 may return to the office from a trip, from lunch or from a client 150 meeting. At step 1614, the accountant 140 opens and reads the electronic message 132 that was previously sent from mobile communication device 130 to first computer 110, e.g., using a native electronic message program on the first computer 110 such as Microsoft Outlook. Referring to FIG. 18, in another embodiment, an icon or indicator 1802, such as a flashing icon or indicator or flashing client name, may be displayed in a screen 1810 generated by the tax preparation program 113 to indicate to the accountant 140 that the accountant reviewed tax return data 112 of that client 150 and/or to inform or remind the accountant 140 that an electronic message 1732 related to the identified client 150 is waiting to be read by the accountant 140.

It should be understood that embodiments directed to sending an electronic message 1732 such as an e-mail or SMS or text message can be implemented with various interfaces and other manners of displaying and clicking a message icon or object 1190. Thus, the embodiments illustrated in FIGS. 11B, 12B, 13C and 15-18 are provided as illustrative and non-limiting examples of how embodiments may be implemented. Further, referring to FIG. 19, and as discussed before with reference to FIG. 14, it should be understood that embodiments may involve different system 1900 configurations that involve different numbers of accountants 140, clients 150, tax returns 111 and electronic messages sent from different mobile communication devices 130 of respective accountants 140 to their computers 110.

Figure 20:
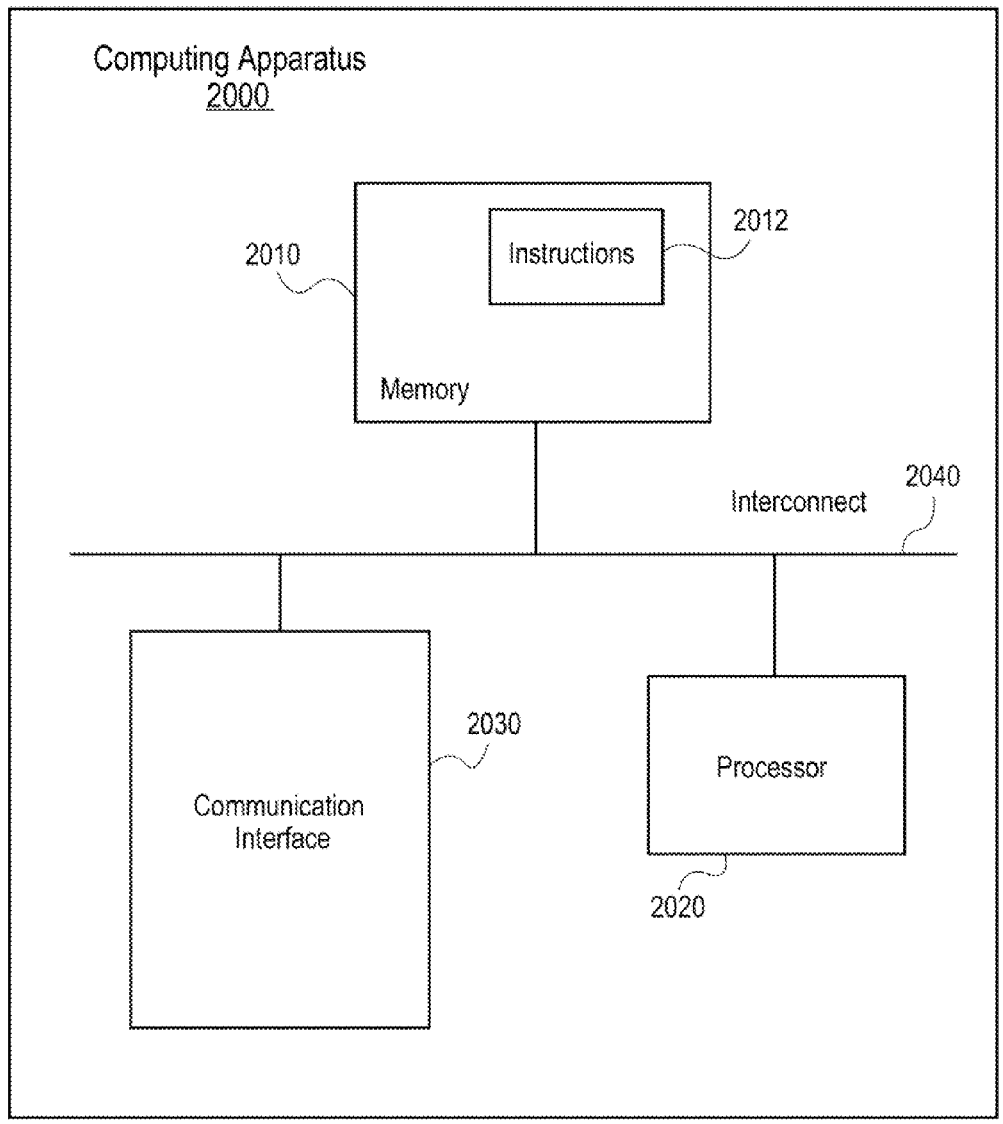
FIG. 20 is a system diagram of components of computing apparatus that may be utilized by various system components.

Referring to FIG. 20, components of a computing device 2000 that may be a component of system embodiments or utilized to perform various method steps includes a memory 2010, program instructions 2012, a processor or controller 2020, a network or communications interface 2030, and connections or interconnect 2040 between such components. For example, the memory 2010 may be or include one or more of cache, RAM, ROM, SRAM, DRAM, RDRAM, EEPROM and other types of memory. The processor unit 2020 may be or include multiple processors, a single threaded processor, a multi-threaded processor, a multi-core processor, or other type of processor. Depending on the particular system component (e.g., whether the component is a computer or a hand held mobile communications device), the interconnect 2040 may include a system bus, LDT, PCI, ISA, or other types of buses, and the communications or network interface may, for example, be an Ethernet interface, a Frame Relay interface, or other interface. The network interface 2130 may be configured to enable a system component to communicate with other system components across a network 170 which, as explained above, may be a wireless or various other networks. Moreover, one or more components of the computing device 2000 may be located remotely and accessed via a network. Accordingly, the system configuration provided in FIG. 20 is provided for ease of explanation and illustration to generally illustrate system components that may be utilized in various embodiments.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magnetooptical storage medium. Examples of carriers include, but are not limited to, a floppy diskette, a memory stick or a flash drive, CD-R, CD-RW, CD-ROM, DVD-R, and DVD-RW. The processor 2020 performs steps or executes program instructions 2012 within memory 2010 and/or embodied on the carrier to implement method embodiments.

Although particular embodiments have been shown and described, it should be understood that the above discussion is not intended to limit the scope of embodiments. Such disclosure is provided for purposes of explanation and illustration only. Thus, various changes and modifications may be made without departing from the scope of the claims.

For example, embodiments may involve different numbers of accountants, clients, tax returns, accountant computers, accountant mobile communication devices. Further, different types of tax return data, whether pre-determined or selected by an accountant, may be uploaded to the second computer and accessed by or downloaded to the mobile communication device. Additionally, all or some of the tax return data that was uploaded to the second computer may be accessed by or downloaded to the mobile communication device.

Embodiments involving electronic messages sent from a mobile communication device may involve different types of messages including, but not limited to electronic mail (e-mail), text or SMS messages.

Further, while embodiments are described with reference to preparation of tax returns and tax data, embodiments may also involve other types of data such as accounting data. Additionally, embodiments may involve mobile access to tax return or other financial data from a mobile communication device of an accountant, from a mobile communication device of a client or both. For example, the client may be provided with a user identification and password information to access tax return data, e.g., summary data including a refund or amount owed, status, etc., which would be data resulting from preparation of the tax return by the accountant using the tax preparation program. Moreover, while embodiments are described with reference to a tax preparation program utilized by an accountant, embodiments may also involve a tax preparation program utilized by a client and the client accessing his or her tax return data using a mobile communication device.

Moreover, while embodiments are described with reference to a single screen view of snapshot or dashboard of tax return data that can be accessed with a single click of selecting a client, embodiments may involve more complicated navigation in which the accountant must navigate multiple pages or make multiple selections or clicks before viewing the desired tax return data.

Moreover, embodiments may involve tax returns at various stages of completion—including partially completed, substantially completed and completed, filed, unfiled, accepted and rejected.

While multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. For example, synchronization may occur at various times during methods, e.g., periodically or in response to a change of data or action. Thus, the methods shown in various flow diagrams are not intended to be limited to a particular sequential order, particularly in instances in which certain steps may or may not be performed or may be performed simultaneously. Accordingly, embodiments are intended to exemplify alternatives, modifications, and equivalents that may fall within the scope of the claims.

What is claimed is:

1. A method for transmitting a message related to an electronic tax return to a computer utilized to prepare the electronic tax return, comprising:

selecting a client from a list of a plurality of clients for whom respective electronic tax returns are being prepared, the list being presented on a display of a mobile communication device transported by an accountant from a first location comprising a first computer executing a tax preparation program used by the accountant to prepare respective electronic tax returns to a second location that is remote relative to the first location;

transmitting a request for electronic tax return data of the selected client from the mobile communication device to a second computer, the first computer and the second computer being in communication with each other;

accessing the second computer and viewing electronic tax return data of the selected client utilizing the mobile communication device;

generating an electronic message related to at least one of the client and the received electronic tax return data using the mobile communication device; and while at a second location remote relative to the first location, transmitting the electronic message from the mobile communication device to the first computer such that an indicator associated with the electronic message identifies the selected client or electronic message presented within a screen generated by the tax preparation program.

2. The method of claim 1, further comprising returning to the first location, accessing the tax preparation application and reading the electronic message displayed in the screen generated by the tax preparation program.

3. The method of claim 1, wherein at least a portion of the electronic message is automatically populated in response to selecting the client using the mobile communication device.

4. The method of claim 3, wherein a "To" field of the electronic message is automatically populated with an electronic mail address of the accountant and a subject field of the electronic message is automatically populated with information related to at least one of the selected client and electronic tax return data of the selected client.

5. The method of claim 1, the electronic message being transmitted from the mobile communication device comprising a cellular telephone or a Smartphone.

6. The method of claim 1, electronic tax return data generated by the tax preparation program being transmitted from the first computer to the second computer and subsequently accessed by the mobile communication device.

7. The method of claim 1, wherein electronic tax return data stored at the second computer is associated with an identifier of the accountant, a connection with the second computer is established with a browser executing on the mobile communication device such that when the address or location is loaded or entered into the browser, electronic tax return data associated with the identifier is displayed on the mobile communication device.

8. The method of claim 1, the electronic tax return data comprising at least one of a status of the electronic tax return, an amount of a refund or amount owed, and information that is required to complete the electronic tax return.

9. The method of claim 1, wherein the second computer hosts respective data of respective electronic tax returns of respective clients of the accountant, the accountant selects a client utilizing the mobile communication device, and electronic tax return data of the selected client hosted by the second computer is displayed on the mobile communication device in response to the request.

10. The method of claim 1, wherein electronic tax return data on the first computer is uploaded to the second computer to synchronize the first computer and the second computer such that electronic tax return data accessed by the mobile communication device is updated or current electronic tax return data of the selected client at the first computer.

11. The method of claim 1, wherein the list of the plurality of clients is generated by the tax preparation program executing on the first computer, the method further comprising the data of the electronic message comprising an indicator identifying a name of the client within the screen generated by the tax preparation program.

12. The method of claim 1, the indicator comprising a flashing icon.

13. A method for transmitting a message related to an electronic tax return to a computer utilized to prepare the electronic tax return, comprising:
   executing a browser on a mobile communication device to access the second computer and display a user interface comprising a list of a plurality of clients for whom respective electronic tax returns are being prepared, a user of the mobile communication device preparing respective electronic tax returns with a tax preparation program executing on a first computer at a first location that is in communication with a second computer hosting electronic tax return data of the plurality of clients, the list of clients being accessed by the user with the mobile communication device at a second location remote relative to the first location;
   selecting a client from the list to display electronic tax return data of the selected client;
   selecting a message icon or object within the user interface to launch a message program on the mobile communication device;
   entering message data into a data entry window generated by the message program to create the electronic message related to the electronic tax return; and
   transmitting the electronic message from the mobile communication device at the second location to the first computer at the first location such that an indicator associated with the electronic message identifies the selected client or electronic message presented with in a screen generated by the tax preparation program.

14. The method of claim 13, the user comprising an accountant who is preparing an electronic tax return on behalf of the selected client.

15. The method of claim 13, after transmitting the electronic message, further comprising returning to the first location, accessing the tax preparation application and reading the electronic message displayed in the screen generated by the tax preparation program.

16. The method of claim 13, wherein at least a portion of the electronic message is automatically populated in response to selecting the client using the mobile communication device.

17. The method of claim 16, wherein a "To" field of the electronic message is automatically populated with an electronic mail address of the user and a subject field of the electronic message is automatically populated with information related to at least one of the selected client and electronic tax return data of the selected client.

18. The method of claim 13, the electronic message being transmitted from the mobile communication device comprising a cellular telephone or a Smartphone.

19. The method of claim 13, wherein electronic tax return data stored at the second computer is associated with an identifier of the user, a connection with the second computer is established with a browser executing on the mobile communication such that when the address or location is loaded or entered into the browser, electronic tax return data associated with the identifier and hosted by the second computer is accessed by the mobile communication device.

20. The method of claim 13, the electronic tax return data comprising at least one of a status of the electronic tax return, an amount of a refund or amount owed, and information that is required to complete the electronic tax return.

21. The method of claim 13, wherein electronic tax return data on the first computer is uploaded to the second computer to synchronize the first computer and the second computer such that electronic tax return data accessed by the mobile communication device is updated or current electronic tax return data of the first computer.

22. The method of claim 13, wherein a plurality of different types of electronic tax return data of the selected client is accessed by or downloaded to the mobile communication device with a single click on the mobile communication device by the user selecting the client.

23. The method of claim 13, the indicator comprising a flashing icon.

24. A method for providing an electronic message related to a tax return to a computer utilized to prepare the electronic tax return, comprising:
   preparing respective portions of respective electronic tax returns of respective clients using a tax preparation program executing on a first computer at a first location;
   uploading respective electronic tax return data of respective electronic tax returns generated by the tax preparation program from the first computer to a second computer that is in communication with the first computer;
   leaving the first location and arriving at a second location that is remote relative to the first location;
   executing a browser on a mobile communication device at the second location to access the second computer, an application executing on the second computer that is operable such that a list of clients for which electronic tax returns are being prepared and respective electronic transaction data is hosted by the second computer is accessed by the mobile communication device and displayed on the mobile communication device;
   selecting a client from the list of a user interface displayed on a screen of the mobile communication device;
   viewing electronic tax return data of the selected client hosted by the second computer using the mobile communication device;
   selecting a message icon or object within the user interface to launch a message program on the mobile communication device;
   entering message data into a data entry window generated by the message program to create the message related to the electronic tax return; and
   transmitting the message from the mobile communication device at the second location to the first computer at the first location such that an indicator associated with the electronic message identifies the selected client or electronic message presented within a screen generated by the tax preparation program.

25. The method of claim 24, after transmitting the message, further comprising returning to the first location from the second location; accessing the tax preparation application and reading the electronic message previously sent from the mobile communication device at the first computer and displayed in the screen generated by the tax preparation program.

26. The method of claim 24, wherein a "To" field of the electronic message is automatically populated with an electronic mail address of an accountant and a subject field of the electronic message is automatically populated with information related to at least one of the selected client and electronic tax return data of the selected client.

27. The method of claim 24, the electronic message being transmitted from the mobile communication device comprising a cellular telephone or a Smartphone.

28. The method of claim 24, the electronic tax return data comprising at least one of a status of the electronic tax return, an amount of a refund or amount owed, and information that is required to complete the electronic tax return.

29. The method of claim 24, wherein a plurality of different types of electronic tax return data of the selected client is downloaded to the mobile communication device with a single click on the mobile communication device by the user selecting the client.

30. The method of claim 24, the indicator comprising a flashing icon.

\* \* \* \* \*